United States Patent
Hawes et al.

(10) Patent No.: US 12,326,924 B1
(45) Date of Patent: *Jun. 10, 2025

(54) BEHAVIORAL PROFILING METHOD AND SYSTEM TO AUTHENTICATE A USER

(71) Applicant: United Services Automobile Association (USAA), San Antonio, TX (US)

(72) Inventors: Brian Christopher Hawes, San Antonio, TX (US); Karen M. Moritz, Fair Oaks Ranch, TX (US); Stephen Seyler Aultman, San Antonio, TX (US); Joseph James Albert Campbell, New Braunfels, TX (US); Debra Randall Casillas, Helotes, TX (US); Jonathan Edward Neuse, Helotes, TX (US); Sara Teresa Alonzo, Mission, TX (US); Thomas Bret Buckingham, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,587

(22) Filed: Oct. 18, 2023

Related U.S. Application Data

(63) Continuation of application No. 17/991,567, filed on Nov. 21, 2022, now Pat. No. 11,797,657, which is a
(Continued)

(51) Int. Cl.
*G06F 21/31* (2013.01)
*G06F 21/45* (2013.01)
(Continued)

(52) U.S. Cl.
CPC ............ *G06F 21/316* (2013.01); *G06F 21/45* (2013.01); *H04L 63/08* (2013.01); *H04L 63/102* (2013.01); *H04L 67/143* (2013.01)

(58) Field of Classification Search
CPC ....... G06F 21/316; G06F 21/45; H04L 63/08; H04L 63/102
See application file for complete search history.

(56) References Cited

U.S. PATENT DOCUMENTS 8,904,479 B1 * 12/2014 Johansson ............... G06F 21/36
  382/181
9,064,104 B2 * 6/2015 Riddiford ............... G06F 21/36
(Continued)

*Primary Examiner* — Chau Le
(74) *Attorney, Agent, or Firm* — Fletcher Yoder, P.C.

(57) ABSTRACT

A computer-implemented method includes identifying behavioral characteristics of a user related to operation of a computing device prior to an online account session. The method includes comparing the behavioral characteristics to a behavioral profile previously developed based on prior behavioral characteristics of the user, and determining an appropriate mark difficulty level based on a variation between the behavioral characteristics and the behavioral profile. The method includes selecting, from a plurality of prompts stored in a prompt database, a prompt that comprises instructions to draw a mark having the appropriate mark difficulty level, where other prompts of the plurality of prompts comprise instructions to draw other marks different from the mark, and providing the prompt to the user as part of a logon process for the online account session.

20 Claims, 10 Drawing Sheets

Related U.S. Application Data continuation of application No. 16/936,688, filed on Jul. 23, 2020, now Pat. No. 11,507,645, which is a continuation of application No. 15/956,634, filed on Apr. 18, 2018, now Pat. No. 10,754,936, which is a continuation-in-part of application No. 15/349,226, filed on Nov. 11, 2016, now Pat. No. 10,091,180, which is a continuation of application No. 14/880,595, filed on Oct. 12, 2015, now Pat. No. 9,514,293, which is a continuation-in-part of application No. 13/801,784, filed on Mar. 13, 2013, now Pat. No. 9,185,095.

(51) Int. Cl.
*H04L 9/40* (2022.01)
*H04L 67/143* (2022.01)

(56) References Cited

U.S. PATENT DOCUMENTS

| | | | |
|---|---|---|---|
| 9,514,297 B2 * | 12/2016 | Williams | G06F 3/04883 |
| 2004/0034801 A1 | 2/2004 | Jaeger | |
| 2005/0253817 A1 | 11/2005 | Rytivaara et al. | |
| 2008/0113791 A1 * | 5/2008 | Williams | G06F 21/36 |
| | | | 463/29 |
| 2011/0034208 A1 * | 2/2011 | Gu | H04M 1/72403 |
| | | | 455/550.1 |
| 2013/0014248 A1 * | 1/2013 | McLaughlin | G06F 3/04883 |
| | | | 726/17 |
| 2014/0333524 A1 | 11/2014 | Liu et al. | |
| 2015/0277697 A1 * | 10/2015 | Liu | G06F 3/04883 |
| | | | 345/173 |

* cited by examiner

BEHAVIORAL PROFILING METHOD AND SYSTEM TO AUTHENTICATE A USER

CROSS-REFERENCE TO RELATED APPLICATIONS

This application is a continuation of U.S. application Ser. No. 17/991,567, filed Nov. 21, 2022, which is a continuation of U.S. application Ser. No. 16/936,688, now U.S. Pat. No. 11,507,645, filed Jul. 23, 2020, which is a continuation of U.S. application Ser. No. 15/956,634, now U.S. Pat. No. 10,754,936, filed Apr. 18, 2018, which is a continuation-in-part of U.S. patent application Ser. No. 15/349,226, now U.S. Pat. No. 10,091,180, filed Nov. 11, 2016, which is a continuation of U.S. patent application Ser. No. 14/880,595, now U.S. Pat. No. 9,514,293, filed Oct. 12, 2015, which is a continuation-in-part of U.S. patent application Ser. No. 13/801,784, now U.S. Pat. No. 9,185,095, filed Mar. 13, 2013, the benefit of all of which is hereby claimed, and all of which are hereby incorporated by reference in their entireties for all purposes.

TECHNICAL FIELD

Various embodiments of the present disclosure generally relate to authenticating a user. More specifically, various embodiments of the present disclosure relate to a behavioral profiling method and system to authenticate a user.

BACKGROUND

Organizations strive to ensure secure and convenient user access to services or accounts. With the proliferation of identity theft and the growing emphasis on convenience, organizations are forced to find a balance between gathering enough identifying information to provide enough confidence in a user's identity and making the services or accounts accessible to users. Regulations and business rules may govern how much or what identifying information the user must provide depending upon the nature of the activity that is requested.

Many traditional systems often rely on authentication measure that include ownership factors (e.g., security token), knowledge factors (e.g., passwords or PINs), and/or inherence factors (e.g., fingerprints or retinal patterns). These authentication measures are often static or presented at pre-defined entry points. To varying degrees, authentication measures based on these factors can be easily circumvented and/or counterfeited. In addition, many systems simply rely on passwords and/or challenge responses at a single point to determine if access should be granted. Also, many systems sacrifice increased security measures for convenience of use. As such, techniques are needed that provide for improved security without sacrificing ease of use for the user.

SUMMARY

In some embodiments, a computer-implemented method includes identifying behavioral characteristics of a user related to operation of a computing device prior to an online account session. The method includes comparing the behavioral characteristics to a behavioral profile previously developed based on prior behavioral characteristics of the user, and determining an appropriate mark difficulty level based on a variation between the behavioral characteristics and the behavioral profile. The method includes selecting, from a plurality of prompts stored in a prompt database, a prompt that comprises instructions to draw a mark having the appropriate mark difficulty level, where other prompts of the plurality of prompts comprise instructions to draw other marks different from the mark, and providing the prompt to the user as part of a logon process for the online account session.

In some embodiments, a system includes a processor and a memory coupled with the processor. The memory includes executable instructions that when executed by the processor cause the processor to identify behavioral characteristics of a user related to operation of a computing device prior to an online account session. The memory also includes executable instructions that when executed by the processor cause the processor to compare the behavioral characteristics to a behavioral profile previously developed based on prior behavioral characteristics of the user and to determine an appropriate mark difficulty level based on a variation between the behavioral characteristics and the behavioral profile. The memory also includes executable instructions that when executed by the processor cause the processor to select, from a plurality of prompts stored in a prompt database, a prompt that comprises instructions to draw one or more marks having the appropriate mark difficulty level, and provide the prompt to the user as part of a logon process for the online account session.

In some embodiments, a non-transitory computer-readable storage medium includes instructions that, when executed by a processor, cause the processor to identify behavioral characteristics of a user related to operation of a computing device prior to a request from the user to initiate an online account session, compare the behavioral characteristics to a behavioral profile previously developed based on prior behavioral characteristics of the user, determine an appropriate mark difficulty level based on a variation between the behavioral characteristics and the behavioral profile, select, from a plurality of prompts stored in a prompt database, a prompt that comprises instructions to draw a mark having the appropriate mark difficulty level, provide the prompt to the user in response to the request from the user to initiate the online account session, identify additional behavioral characteristics of the user while the user draws the mark, compare the additional behavioral characteristics to the behavioral profile, and initiate the online account session in response to determining that a respective variation between the additional behavioral characteristics and the behavioral profile is within a threshold.

While multiple embodiments are disclosed, still other embodiments will become apparent to those skilled in the art from the following detailed description, which shows and describes illustrative embodiments. As will be realized, embodiments of the present disclosure are capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which.

Figure 1:
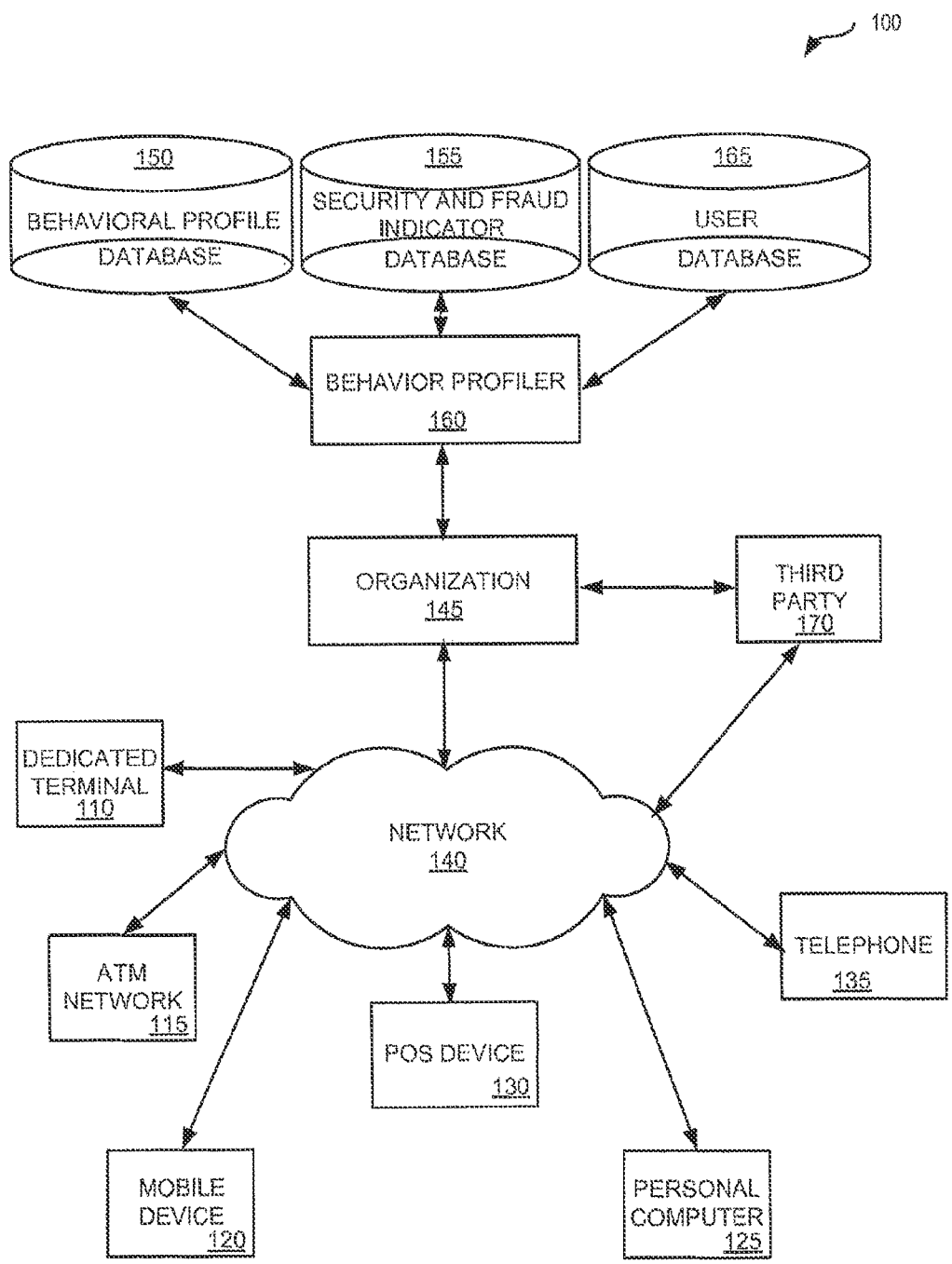
FIG. 1 illustrates an example of an operating environment in which a behavioral profiler may be utilized.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to authenticating a user. More specifically, various embodiments of the present disclosure relate to a behavioral profiling method and system to authenticate a user.

Although this disclosure discusses the methods and systems for behavioral profiling in the context of fraud detection, one of ordinary skill in the art will recognize that the concepts disclosed herein may be used in various other areas such as marketing initiatives. For clarification, a behavioral profile means a history of past behaviors in combination with derived metrics that are created by applying mathematical and statistical functions to the history of past behaviors. Additionally, for clarification, this application will govern any inconsistencies with material incorporated by reference.

The increased sophistication and diversity of security attacks on electronic systems have forced companies to be reactive in fighting the resulting fraud. For example, a company may not be aware of a security attack that resulted in account takeover ("ATO") fraud until an account owner reports it to the company. At this point, the company attempts to understand and reconstruct the techniques used by the criminals to create the security breach. This retroactive approach typically does not meet expectations of the customers. Instead, the customer expects the organizations to take the appropriate precautions to protect their data. In addition, the lack of comprehensive proactive protection plans to prevent cyber-fraud may result in dissatisfied customers and/or legal liability. Thus, a proactive and flexible approach for detecting suspicious activity in real-time or near real-time is needed.

In the following description, for the purposes of explanation, numerous specific details are set forth in order to provide a thorough understanding of embodiments of the present disclosure. It will be apparent, however, to one skilled in the art that embodiments may be practiced without some of these specific details.

Figure 9:
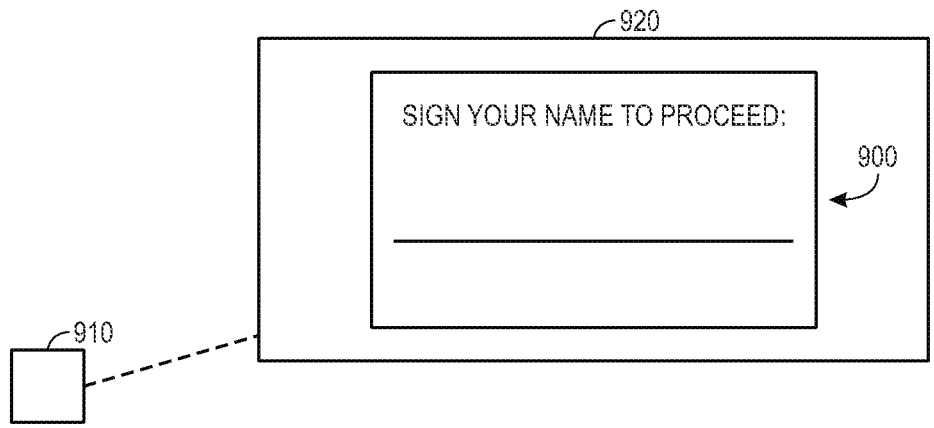
FIG. 9 illustrates an example of a prompt that may be provided to a user by a system in accordance with various embodiments of the present disclosure.
Figure 10:
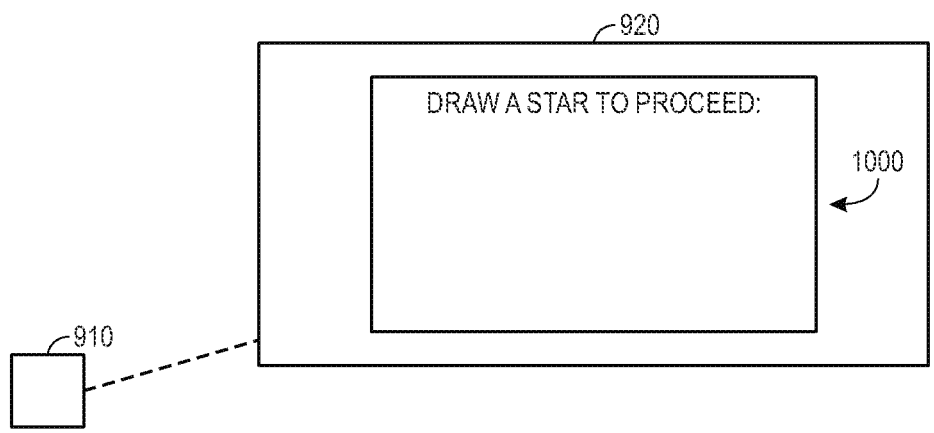
FIG. 10 illustrates an example of another prompt that may be provided to a user by a system in accordance with various embodiments of the present disclosure.

Turning to FIGS. 9 and 10, illustrated therein are examples of prompts 900, 1000 that may be provided to a user as part of an authentication process. The prompts 900, 1000 may be provided by a system 910 that is configured to operate in accordance with present embodiments. As shown, the prompt 900, 1000 may include a request for the user to draw a mark or symbol, such as a signature representing the user's name or initials, a letter, or a shape, for example. The prompt 900, 1000 may be presented on a display screen 920 of a computing device when the user attempts to logon to begin a session (e.g., online or website account session). For example, upon accessing a logon webpage, the user may be prompted to enter the mark alone or in combination with an identifier (e.g., an identifier known or created by the user, such as a username, a password, or an identification number, such as a social security number, birthday, account number). In some cases, the mark may be used instead of a password (e.g., the mark may function as a password), which may enable the user to efficiently begin the session without having to remember a password or other complex identifier. The mark may not be user-created or user-selected (e.g., is not a user-created or user-selected combination of numbers, letters, shapes, or other symbols), and thus, in some embodiments, the user does not need to remember the mark, but only needs to draw a particular mark as instructed by the prompt 900, 1000.

Instead, multiple prompts (e.g., the prompts 900, 1000 and other prompts) may be generated by the system 910 and/or by an administrator of the system 910 (e.g., someone other than the user of the system 910). In some embodiments, the system 910 may not allow the user to provide any inputs to create or modify the multiple prompts in the prompt database or to affect which prompts are provided to the user during the logon process. However, in some embodiments, the system 910 may allow the user to provide inputs indicating a preference that certain prompts of the multiple prompts be used or omitted from the user's logon process or at certain stages of the user's logon process, and the system 910 may consider the input when selecting prompts for the user. Each of the multiple prompts in the prompt database includes unique instructions to drawn one or more marks (e.g., one prompt includes instructions to draw one mark, and other prompts include instructions to draw other marks different from the one mark). In operation, the system 910 may select one prompt (e.g., the prompt 900 of FIG. 9) that includes instructions to draw a signature or the system 910 may select another prompt (e.g., the prompt 1000 of FIG. 10) that includes instructions to draw a star, and then the system 910 may present the selected prompt to the user. The system 910 may select one prompt at certain times or stages of the logon process, and the system 910 may select another prompt at certain other times or stages of the logon process. Various other factors may be considered in selection of the prompt that this provided to the user in step 1101, as discussed herein.

In certain embodiments, the prompt 900, 1000 may be presented on the display screen 920 after the user enters an incorrect username and/or password while attempting to logon to begin a session. For example, upon entering an incorrect password, the user may be prompted to enter the mark instead. Thus, the mark may be utilized in addition to a password or as a backup method to authenticate the user, instead of other types of backup methods, such as backup methods that rely on the user's knowledge or memory of certain facts (e.g., identification numbers; security questions, such as "what was the make and model of your first car," "what elementary school did you attend").

In certain embodiments, the user may be prompted to enter the mark prior to accessing sensitive information or carrying out certain activities during a session. For example, the user may logon to begin a session (e.g., via a username, a password, and/or a mark), and then the user may be prompted to enter a mark (e.g., as part of a challenge) prior to transferring money from an account. Thus, one or more marks may be utilized at different stages or in different situations to verify the user, as discussed in more detail below.

It should be appreciated that the user may be prompted to draw multiple marks (e.g., the same mark multiple times or multiple different marks) as part of the authentication process. Furthermore, the difficulty level of the mark and/or the number of marks requested may vary based on other metrics (e.g., variations between current usage patterns and a behavioral profile of the user) and/or based on a risk level associated with the activity, or the like. For example, if recent manipulation of the mouse of the computing device varies from typical manipulation of the mouse by the user, the user may be prompted to enter more than one mark or a relatively difficult mark (e.g., a star and a circle, or a star rather than a circle) to logon to the session or to proceed in the session. In such cases, the system 910 may determine an appropriate mark difficulty level and select a prompt that instructs the user to draw one or more marks having the appropriate mark difficulty level.

The mark may be drawn by the user in any suitable manner, such as by clicking and holding a button on a mouse as the user simultaneously moves the mouse to draw the shape on the display of the computing device, or the mark may be drawn via a stylus or other object on a touchscreen display of the computing device. The mark drawn by the user during the session may be compared to one or more marks in a profile (e.g., mark profile), which may include or be based on one or more marks drawn during prior sessions and/or during a setup process. For example, upon setting up an account (e.g., an online account), the user may be prompted to select a username, a password, and/or to draw one or more marks, such as to draw a signature representing the user's name and/or initials, a letter, a star, a circle, or other shapes or symbols. The user may be prompted to draw the one or more marks multiple times during the setup process.

The one or more marks drawn by the user during account setup may be recorded and stored in a profile for the user. In particular, the one or more marks may be drawn by the user during account setup in response to provided prompts (e.g., the one or more marks are not user-created during account setup, but instead the user only draws the one or more marks instructed by the prompts to generate the profile). In some embodiments, behavioral characteristics of the user as the user draws the one or more marks may be recorded and stored in the profile. For example, the behavioral characteristics may include how the user moves the mouse while drawing each mark, the time it takes the user to draw each mark, what part/section/area of a button on the mouse the user holds down when drawing the mark, an amount of pressure applied to the mouse when drawing the mark, how long the user holds down the button on the mouse, whether the user draws the mark with a continuous movement of the mouse or whether the user starts and stops the mouse while drawing the mark, a speed of the mouse while drawing various portions of the mark, and/or any other computer utilization metrics.

Figure 11:
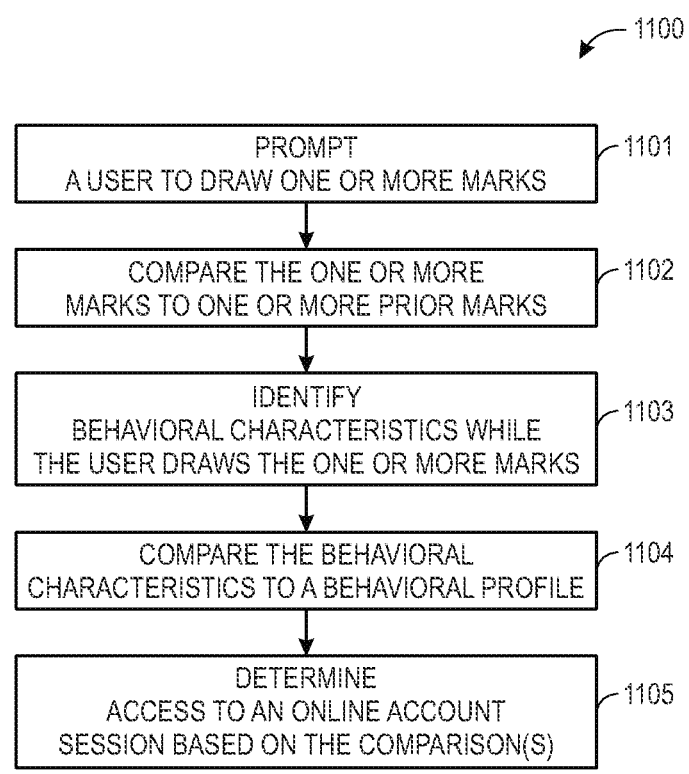
FIG. 11 is a flowchart illustrating a method of utilizing a prompt as part of an authentication process in accordance with various embodiments of the present disclosure.

FIG. 11 is a flowchart illustrating a method 1100 of utilizing the system 910 to provide a prompt (e.g., the prompt 900 of FIG. 9 or the prompt 1000 of FIG. 10) as part of an authentication process. In step 1101, a prompt to draw one or more marks may be provided to a user. It should be appreciated that the prompt provided in step 1101 may be selected from a prompt database that stores multiple prompts, and each of the multiple prompts includes unique instructions to drawn one or more marks, as discussed above.

In step 1102, the current mark drawn by the user may be compared to the one or more prior marks stored in the profile for the user (e.g., via image matching algorithms, such as template matching and feature detection) to determine whether the current mark matches the one or more prior marks stored in the profile for the user (e.g., is an acceptable variation of the one or more marks stored in the profile for the user; is within a mark matching threshold). Additionally or alternatively, the behavioral characteristics of the user as the user draws the current mark may be identified, in step 1103, and then compared to the behavioral characteristics stored in the profile, in step 1104. For example, features of a current mark drawn by the user may be compared to respective features of one or more marks stored in the profile (e.g., via image matching algorithms, which may consider a distance between points of the mark, angles between the lines of the mark, position relative to other features of the prompt 900, 1000 on the display), and the behavioral characteristics as the user draws the current mark may be monitored and compared to the behavioral characteristics stored in the profile (e.g., the time the user takes to draw the current mark compared to the average or median time to draw one or more marks during account setup and/or prior sessions).

In step 1105, the system 910 may make a decision regarding whether to grant access to an online account session or to block access to the online account session based on one or both of the comparisons performed in steps 1102 and 1104. More particularly, if a variation between the current mark and the one or more prior marks is within a mark matching threshold and/or if a variation between the behavioral characteristics and the behavioral characteristics stored in the profile is within a respective threshold, the user may be granted access to the online account session or be permitted to proceed with the online account session. However, if the variation between the current mark and the one or more prior marks is outside of the mark matching threshold and/or if the variation between the behavioral characteristics and the behavioral characteristics stored in the profile is within the respective threshold, the user may be denied access to the online account session or be blocked from proceeding with the online account session. Additional details related to use of the mark as part of the authentication process are discussed in detail below.

A First Alternative and/or Complimenting Embodiment

Figure 8:
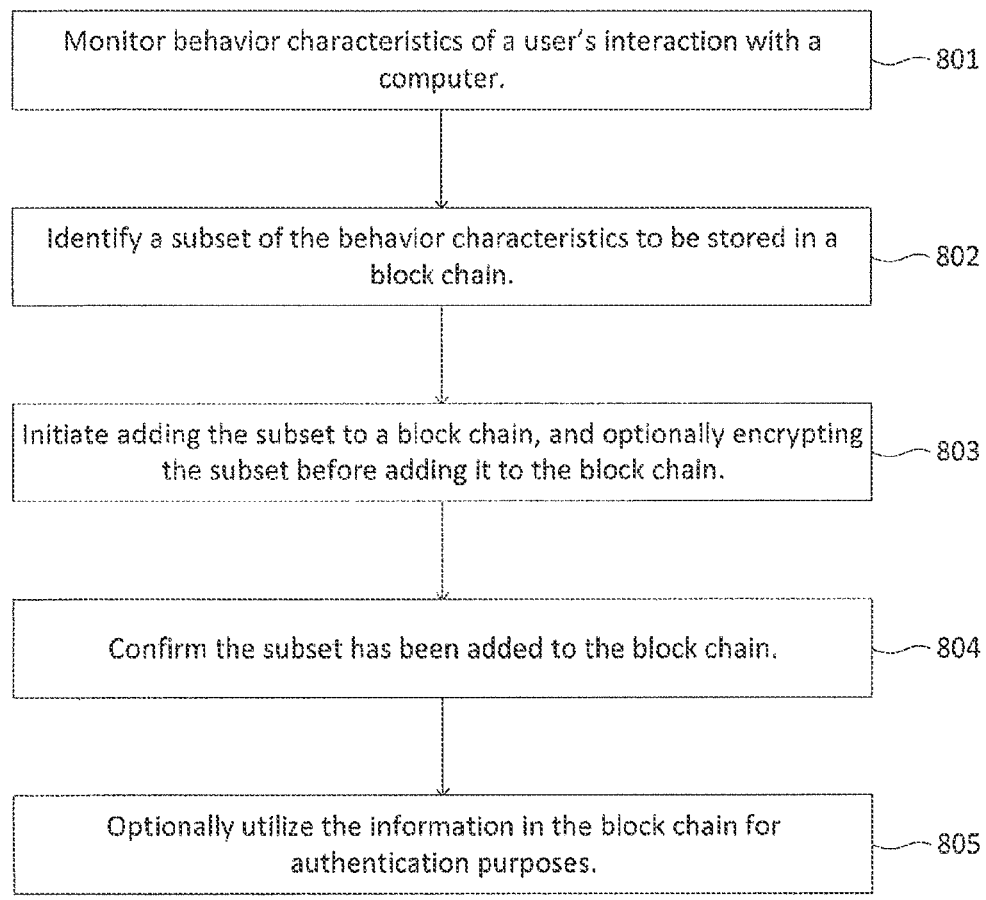
FIG. 8 illustrates an exemplary process of practicing one or more embodiments described herein.

Turning to FIG. 8, illustrated therein is an exemplary process 800 of utilizing one or more embodiments described herein. Starting at step 801, behavior characteristics for a user are monitored. The behavior characteristics may include how the user manipulates and utilizes a computing device. For example, how the user moves the mouse while the user is reading a web page, whether the user scrolls a web page by using a scroll wheel or whether the user selects and drags a scroll bar. In another example, it may be monitored how quickly the user moves the computer mouse. In other examples, it may also be monitored what part/section/area of a button that a user hits when the user is selecting that button, how long the user holds the mouse button down, whether the mouse moves when the user holds the mouse button down, how quickly the user types, how often the user commits typos, which typos the user typically commits, how quickly the user types certain phrases and/or strings of characters, and/or any other computer utilization metrics as may be recognized by those skilled in the art.

Then, a subset of those behavior characteristics are selected (step 802). This subset may include a single behavior characteristic, all of the measured and monitored behavior characteristics, and/or a partial collection of the behavior characteristics. Then, the subset may be optionally encrypted and added to a block chain (step 803). For conformation (step 804) that the subset is stored in the block chain, the user may wait for the subset to be entered into a record of the block chain, and then optionally additionally wait for a (minimum) number of subsequent data records (e.g., the six data records generally/typically used to confirm that a Bitcoin transaction cannot be backed out). Finally, (step 805) a user may provide decryption information to an entity (e.g., a company) that allows the company to decrypt at least part of the user's behavior characteristics stored in the block chain, and that may be used to authenticate the user (e.g., by comparing the behavior characteristics stored in the block chain as compared to behavior characteristics that the user is exhibiting while using a website operated by the entity). In some embodiments, the one or more marks may be used as an encryption key and/or a decryption key.

In one use case, a method of using one or more embodiments described herein includes monitoring behavioral characteristics of a user interacting with a first computer, identifying a subset of the behavioral characteristics to add to a block chain, sending a message to add the subset to the block chain, confirming (e.g., identifying) that the subset has been added to the block chain.

Optionally, identifying that the subset has been added to the block chain includes identifying a number of successive data records in the block chain that include the subset. Alternatively, and/or in the same use case, identifying that the subset has been added to the block chain may also include receiving an indication that a minimum number of subsequent data records have been added to the block chain, thus lowering, if not effectively eliminating, the chance that the data added to the block chain can be backed out.

In one or more situations, a data record that includes at least part of the transactions represented by the block chain may be stored on a plurality of computers. In exchange for storing at least part of the block chain, the storing computers and/or their owners/operators may receive a compensation (e.g., a currency, such as one managed by the block chain itself). The act of storing the data record may be configured such that no more than a percentage (e.g., 20%) is stored on a given computing device and/or virtual computing device (e.g., a "cloud" of computing devices).

In one use case, the encrypted user behavioral characteristics may be utilized to authenticate the user. For example, the user could supply information to decrypt the behavioral characteristics (e.g., a decryption key), and the entity to which the user is attempting to authenticate may utilize the decryption key to first get and decrypt that information, and then compare it to behavioral characteristics acquired based on whomever is interacting with the entity's computers (presumably the person attempting to authenticate).

In another use case, comparing the user's current behavioral characteristics against the stored behavioral characteristics may be utilized to generate a challenge level for the user to authenticate himself/herself. For example, if the two sets of behavioral characteristics are very similar, then the authentication could be relatively lower (e.g., provide a PIN; draw a simple mark or one mark), whereas if the two sets of behavioral characteristics are somewhat dissimilar, then the authentication could be relatively higher (e.g., require voice authentication for a word or phrase; draw a complex mark or multiple marks). Further, it is contemplated herein that if the two sets of behavioral characteristics are more dissimilar than a predetermined threshold, then the user may be summarily prevented from authenticating at all.

Additional Alternative and/or Complimenting Embodiment(s)

Methods and systems for verifying a user proactively based on normal user patterns are described. In some embodiments, a behavioral profile can be created based on patterns of user behavior. As the user begins a new session interacting with the company (e.g., through a website, phone, or other channel), the interactions (or behaviors) are observed and constantly compared to normal patterns of interaction identified by the behavioral profile. A fraudster's behavior will deviate enough from a user's normal pattern that the presence of fraud can be detected before it affects the user.

Detecting these deviations, or anomalies, relies on creating a normal user profile by looking at the behavior of cross-channel contact the user has with an organization. The channels of interaction may include personal computers, mobile devices, face-to-face communications, and related hardware and software (e.g., web portals, mobile applications), and the like. The normal user profile created from the cross-channel contact could be based on online behavioral metrics such as the rate in which a user accesses the organization's digital channels, the number of pages he/she usually visits, the browser and device used to connect, and the number of different IP addresses used, etc. By comparing usage patterns in a current session to usage patterns in previous sessions, the previous usage patterns embodied in a behavioral profile reveals deviations.

Depending upon the importance or significance of the detected variations between the current usage patterns and the previous usage patterns, a challenge level may be implemented to proceed in the session. The challenge may require the user to provide additional information, allow the user to proceed with the session, or reject the user from continuing with the session. In some embodiments, the challenge is an authentication challenge. The user may be asked for additional information, but in some embodiments, the user is authenticated without the user responding to a request (e.g., information is collected from the device). In many cases, the challenge level will be different based on the detected variation and the sensitivity of the information and/or activity being requested. For example, a request to see a balance could require a lower challenge level than transferring funds to a previously unknown account. As noted above, a mark may be utilized as part of the authentication process to verify the user. The mark may be utilized as a password (e.g., instead of a password) and/or in addition to a password as part of the process to logon and begin the session. Features of the mark may be considered in combination with the usage patterns to verify the user, and behavioral characteristics related to the manner in which the user draws the mark may also be considered. In some embodiments, the mark may be utilized as part of the challenge. For example, the user may be prompted to draw the mark to proceed with the session.

FIG. 1 illustrates an example of an operating environment 100 in which some embodiments of the present disclosure may be utilized. As illustrated in FIG. 1, the operating environment can include dedicated terminal 110, ATM network 115, mobile device 120, personal computer 125, POS device 130, telephone 135, network 140, organization 145, behavioral profile database 150, security and fraud indicator database 155, behavior profiler 160, user database 165, and third party 170. Other operating environments may include different combinations of these and/or other devices.

The embodiments illustrated in FIG. 1 allow user interactions with organization 145 through various points of interaction such as, but not limited to, dedicated terminals 110 (e.g., public terminal or kiosk), ATM networks 115 (e.g., interbank ATM network and intrabank ATM networks), mobile devices 120 (e.g., mobile phone), personal computers 125, point of sale (POS) devices 130, by a landline telephone represented by telephone 135, and face-to-face contact (e.g., in-person contact or via video conferencing). The points of interaction may run one or more applications or clients that allow a user to interact with network 140. Such applications may provide access to the processing systems and interfaces of organization 145.

The points of interaction may be channels for a user to engage in activities with organization 145. For example, a user may use a web portal on a personal computer 125 (i.e. a channel) to engage in activities such as viewing an account, trading funds, purchasing insurance, or submitting or processing a negotiable instrument. Points of interaction telephone 135, POS device 130, mobile device 120, dedicated terminal 110, and their related hardware and software may be channels allowing for other user interactions such as video conferencing, interaction through a mobile application, or SMS messaging.

Dedicated terminals 110 such as public terminals/kiosks may be computers available to the public and/or specially designed kiosks that interact with network 140. ATM networks 115 can be any set of ATMs in an interbank ATM network and/or intra-bank ATM network.

Mobile device 120 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), netbooks, laptops possibly with a wireless connection (such as an 802.11 a/b/g connection or mobile broadband connection, such as via a 3G or 4G wireless network).

Personal computers 125 may be any computer (e.g., desktop computers, laptop computers, netbooks, tablet computers, Internet-enabled television devices, etc.) connected to network 140. Dedicated terminal 110, mobile device 120, and personal computer 125 may be capable of exchanging communication in the form of voice and/or video.

POS devices 130 can be any device used as a checkout or payment receiving mechanism for a merchant or service provider such as a hospital, ambulance company, doctor, automobile repair shop, pharmacy, clothing store, and others. For example, POS device 130 can be a terminal located at a merchant, a computer-based interface such as a webpage or custom application, a telephone payment system, and others. Network 140 may include communications networks, such as a banking network. In accordance with embodiments of the present invention, network 140 can use a variety of interaction methods, protocols, and systems. For example, network 140 can use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used.

The contact with organization 145 may occur through sessions (e.g., to interactions devoted to a period of contact through a channel) at different points of interaction. Organization 145 may be a membership organization, and the users may be members or potential members of the membership organization. Organization 145 may be a financial institution, or any kind of entity providing any type of service. Organization 145 may be communicably coupled with third party 170. Third party 170 is any organization or source of information external to organization 145 that provides organization 145 with information that may be used in determining potential or real threats. For example, information provided by third party 170 may include the identity of IP addresses known to be fraudulent, known malware on systems or networks, patterns that indicate fraud, etc. Third party 170 may also provide information that is specific to a user. For example, third party 170 may provide information that a credit card belonging to the user has recently been compromised. The information may be stored in security and fraud indicator database 155.

Organization 145 may include various computing systems, behavior profiler 160, behavioral profile database 150, security and fraud indicator database 155, and user database 165. Behavior profiler 160 can use information from various databases and third party 170, including a behavioral profile related to the user, information related to the risk of the activity and information acquired in connection with the user, and determines a challenge level (e.g., an authentication level or protocol, which may include drawing one or more marks) that the user must surpass in order to continue with the session or particular activity within the session.

A session may be an interactive exchange defined by a beginning interaction, such as logging into an account, and an ending interaction such as logging out. For example, a session may begin when the user navigates to a webpage (i.e., the channel) and then end when the user navigates away. Similarly, a session may begin when a user initiates a phone call (i.e., the channel) with a customer representative and then end when the phone call is terminated. The interactions generated during each session can be monitored and/or recorded. Based on the interaction generated during sessions with organization 145, behavior profiler 160 dynamically can generate a current usage pattern for the session as information becomes available.

Behavior profiler 160 can be communicably coupled to one or more databases such as behavioral profile database 150, security and fraud indicator database 155, and user database 165, and may receive information from third party 170. These databases and external sources include information that may be used by behavior profiler 160. For example, behavioral profile database 150 may include user-specific behavior profiles generated to document normal usage patterns for the user. These profiles may be generated based on transaction information relating to past transactions such as the time of day transactions were made, the amount and destination of the transfer, the channels used, activities and times associated with those activities (time spent making the transaction), behavioral biometrics, etc. The profiles in the behavioral profile database 150 may also be based on information relating to the user's account, such as how many logon attempts have been made, the number of failed logon attempts, the number of successful logon attempts, where the attempts originated from, when/where/from what machine the user has changed passwords, registered devices, and so on. The profiles in the behavioral profile database 150 may be further based on the user's common purchasing habits.

The behavior profile 160 may also include information related to one or more user-specific marks (e.g., copies of the one or more marks or data related to features of the one or more marks drawn by the user during an account setup process) and/or user-specific behavior profiles generated to document normal behavioral characteristics of the user when drawing the one or more user-specific marks (e.g., during the account setup process). These behavior profiles may be generated based on how the user moves the mouse while drawing each mark, the time it takes the user to draw each mark, what part/section/area of a button on the mouse the user holds down when drawing the mark, an amount of pressure applied to the mouse when drawing the mark, how long the user holds down the button on the mouse, whether the user draws the mark with a continuous movement of the mouse or whether the user starts and stops the mouse while drawing the mark, and/or any other metrics.

User database 165 stores information about users, including employment information, account balances, credit ratings, home ownership information, annual salary, length of membership, and/or other information such as the information used in creating the behavioral profiles stored in behavioral profile database 150. User database 165 may store security preferences or instructions that the user has expressed (e.g., if a requested transaction exceeds $100, ask the requestor to verify a one-time password sent to an email address of the user). The user database 165 may store security preferences or instructions related to use of the marks (e.g., upon request to transfer money, ask the user to draw one or more marks to proceed).

Security and fraud indicator database 155 stores information relating to physical security events, information security events, cyber intelligence, IP addresses that organization 145 has previously received attacks from, addresses of known fraudsters, known malware on systems or networks, risk scores associated with IP addresses or networks, etc. This information may also be provided or supplemented by third party 170. This information may be applicable to all users, or it may be related to a particular user noted in the user database 165 or included in the behavioral profile of the user stored in the behavioral profile database 150. Thus, this information may impact the riskiness of an activity for a particular user or impact the users globally. In some embodiments, these databases may be integrated into one database.

A computer system associated with the organization or authorized third parties may be able to access these databases for account information, user information, security information, information related to the one or more marks, and other stored information. In addition; third parties may provide information relating to the user such as the location of the user, a credit score of the user, or any other security information.

Figure 2:
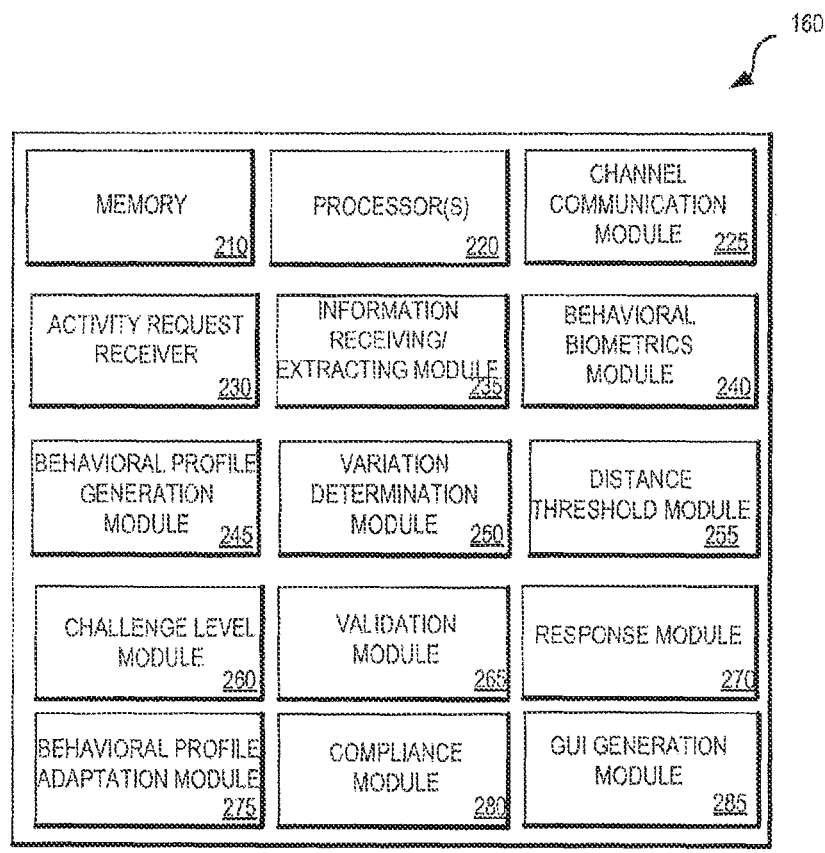
FIG. 2 is a block diagram illustrating components that can be included in a behavior profiler.

FIG. 2 is a block diagram illustrating components that can be included in a system such as behavior profiler 160. According to the embodiments shown in FIG. 2, memory 210, processor(s) 220, channel communication module 225, activity request receiver 230, information receiving/extracting module 235, behavioral biometrics module 240, behavioral profile generation module 245, variation determination module 250, distance threshold module 255, challenge level module 260, validation module 265, response module 270, behavioral profile adaptation module 275, compliance module 280, and Graphic User Interface (GUI) generation module 285. Other embodiments of the present disclosure may include some, all, or none of these modules and components along with other modules, applications, and/or components. The modules and components illustrated in FIG. 2 may be hardware, firmware, or software or a combination. Still yet, some embodiments may incorporate two or more of these modules into a single module and/or associate a portion of the functionality of one or more of these modules with a different module.

For example, in one embodiment, the functionality associated with behavioral profile adaptation module 275 and the functionality associated with behavioral profile generation module 245 can be incorporated into a single behavioral profiling module. In other embodiments, the challenge level module 260 can be separated into several modules such as a challenge level determination module and a challenge level implementation module.

Memory 210 can be any device, mechanism, or populated data structure used for storing information. In accordance with some embodiments of the present disclosure, memory 210 can encompass any type of, but is not limited to, volatile memory, nonvolatile memory, and dynamic memory. For example, memory 210 can be random access memory, memory storage devices, optical memory devices, magnetic media, floppy disks, magnetic tapes, hard drives, SIMMs, SDRAM, DIMMs, RDRAM, DDR SDRAM, SODIMMS, erasable programmable read-only memories (EPROMs), electrically erasable programmable read-only memories (EEPROMs), compact discs, DVDs, and/or the like. In accordance with some embodiments, memory 210 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 210.

Memory 210 may be used to store instructions for running one or more applications or modules on processor(s) 220. For example, memory 210 could be used in one or more embodiments to house all or some of the instructions needed to execute the functionality of channel communication module 225, activity request receiver 230, information receiving/extracting module 235, behavioral biometrics module 240, behavioral profile generation module 245, variation determination module 250, distance threshold module 255, challenge level module 260, validation module 265, response module 270, behavioral profile adaptation module 275, compliance module 280, and GUI generation module 285.

Channel communication module 225 exchanges communications between the organization 145 and users through various channels. Examples of channels include, but are not limited to, computing devices such as tablets, personal computers, smartphones, POS devices, ATMs, and laptops; telephones such as landline telephones or a mobile phones; and face-to-face contact between a user and an employee at a brick and mortar building of the organization (e.g., data entry in the system in response to user interaction). Channels may also include software and firmware associated with the computing devices and communications devices (e.g., mobile phones) such as web portals, applications, networks, mobile applications, and instant messaging systems. Channels may also include hardware associated with the computing devices and telephones such as the network hardware, credit card scanners, and retinal scanners.

Users may interact with the organization via the channel communication module 225 during one or more sessions. As described above, a session may be an interactive exchange defined by a beginning interaction, such as logging into an account, and an ending interaction such as logging out. In some embodiments, sessions between the user and the organization may be contiguous time periods of interaction or related interactions that occur over a series of distinct time periods. In another example, a session may be a phone call, which begins with a user calling the organization and ends when the call is terminated. One or more activities may take place during a single session. For example, a website account session may begin with the user logging in using a username/password/mark, completing several activities such as checking an account balance, ordering a new credit card, and transferring funds, and ending the session by logging out. A session generally takes place through a single channel. In some embodiments, however, multiple channels may be used in a single session by porting a session from one channel, such as a mobile device, onto a second channel, such as a computer.

During a session between the user and the organization, the user may request to engage in one or more activities. The request can be routed to the activity request receiver 230 once the request has been received. Channel communication module 225 may provide information relating to the channel, activity, and/or user to the information receiving/extracting module 235.

Activity request receiver 230 receives requests from a user to engage in an activity. Activity request receiver 230 receives the request through channel communication module 225 during a session with the user. An activity may be any activity in which a user interacts with organization 145, such as viewing a webpage, transferring funds, accessing an account, purchasing insurance, depositing funds, opening an account, paying a bill, and requesting a line of credit or a credit card. Due to regulatory and/or business restrictions, some activities may only be engaged in through specific channels.

Information receiving/extracting module 235 receives, collects, and/or extracts information relating to the user, activity, and/or channel. The information may include behavioral characteristics of the user interactions during a current session with the user. It should be appreciated that behavioral characteristics of the user at any time after turning on the computing device or otherwise interacting with the computing device may be collected (e.g., stored locally on the computing device and then accessed by the information receiving/extracting module 235 when the user accesses a website or attempts to logon to an online account). Such information may be used in the behavioral profile generation module 245, behavioral profile adaptation module 275, and/or variation determination module 250 in detecting fraud. For example, information receiving/extracting module 235 may receive current device information and provide it to the variation determination module 250 to determine if there are variations between the current device information and device information stored in the user's behavioral profile.

Information relating to the channel may include device information such as information relating to usage on the device, a device fingerprint or other device identification, a phone number, a service provider, device location information, language, network, internet service provider, internet protocol address, etc. Information relating to the channel may also include information relating to known risks, such as a risk of the location (e.g., IP addresses originating in China may be suspicious), risks associated with particular IP addresses or phone numbers, and the like. Information relating to the channel may be received from or collected by the channel communication module 225, securities and fraud indicators database 155, third party 170, and other sources.

Information relating to the activity may include a type of activity (e.g., deposit, transfer, logon request), a risk indication of the activity (e.g., transferring funds vs. depositing funds), and specific activity information such as time of day, amount of money, location of transfer, type of account, and reason for request. Information relating to the activity may be collected from activity request receiver 230, third party 170, user database 165, and other sources. Additional information may be received from channel communication module 225.

Information relating to the user may include web behaviors, security questions and answers, usernames, marks, accounts, family information, websites visited, amounts, locations, devices, and activities. Information relating to the user may also include military status (active duty), military rank, marital status, gender, product depth and tenure with organization 145, and age of children (if any). In some embodiments, particularly when little information is known about the user, information receiving/extracting module 235 may collect demographic information data of others similar to the user. Demographic information may be collected from marketing groups or other sources.

Information receiving/extracting module 235 may also collect information relating to suspicious activities noted in the user's account. For example, a notice documenting an agent's impressions or concerns may be placed in the user's account indicating past fraudulent activity or suspicious activity. Information relating to the user may be collected from third parties 170, user database 165, and other sources.

Information specific to a current session with the user through a web portal (web behaviors) may be extracted, collected, or gathered such as: user CPU time, system CPU time, the amount of time between when a user logs in (when during the day/week/month does the user log in), amount of character during the application execution, combined process size—that is, the maximum size of the process during execution, the integral of real memory usage over time, in units of KByte/seconds, the virtual size of the text segment, the total number of ties opened during execution, the number of major and minor page faults, the number of pages read in, a measure of disk 10, elapsed time in seconds—that is, the exit time minus the start time of the application, number of signals received during the execution of the application, name of new user name (if the user name was changed during execution), the number of unique IP addresses used per month, whether the user name was changed during execution, hour (0-23) in which activity was done, the number of distinct pages a user normally views per session, whether the application executed was on a remote network host, the number of different computers used per month, name of remote network host on which the application was invoked, name of application that was invoked on a remote network host, whether the application executed was on a local network host, name of local network host on which this application was invoked, name of application that was invoked on a local network host, the number of different users with the same IP, number of seconds elapsed since the last audit record for this application, and the number of times a user logins per day/week/month. Other web behaviors may also be collected in some embodiments.

Behavioral biometrics module 240 can gather and analyze behavioral biometrics. Biometrics may be used to verify a user based on a biological attribute that is difficult to replicate. While traditional biometric approaches such as fingerprinting and/or retinal scanners work effectively, these approaches require specialized equipment. Behavioral biometrics identify behaviors that are heavily influenced by a person's specific biology but are easier to measure than the underlying biology itself. For example, users may be identified by measuring the cadence with which the user typed their username and password, spacing between key presses, and/or the duration of each key press. In embodiments in which one or more marks are used to logon to an online account, the behavioral biometrics may include how the user moves the mouse while drawing each mark, the time it takes the user to draw each mark, what part/section/area of a button on the mouse the user holds down when drawing the mark, an amount of pressure applied to the button on the mouse when drawing the mark, how long the user holds down the button on the mouse, whether the user draws the mark with a continuous movement of the mouse or whether the user starts and stops the mouse while drawing the mark, and/or various other metrics. Markov models may be trained to model these and other behavioral biometrics of a user.

Information collected and analyzed by behavioral biometrics module 240 may be used in distinguishing multiple users of a single account. For instance, a user and the user's spouse may use the same credentials to logon and manage their checking and auto products. By using the keystroke-based biometrics, the number of different users of a single account may be identified, and behaviors may be more accurately attributed to different individuals. Use of the one or marks during the session (e.g., to logon to the account or as a challenge level to proceed with the session after logging into the account) may also be used to distinguish multiple users of a single account.

Behavioral biometrics module 240 may analyze the user's behavioral biometric data and provide the user's behavioral biometrics information to the behavioral profile generation module 245 and/or the variation determination module 250 to provide additional information about the user and reduce false positive rates when detecting fraud.

Behavioral profile generation module 245 may generate behavioral profiles for each user. In general, a behavioral profile is developed based on prior usage patterns of the user through the interactions occurring through the various channels. The behavioral profiles may be generated in a variety of ways using a variety of methods and models which are described in more detail below. The behavioral profile may include information related to behavioral characteristics of the user as the user draws one or more marks, as noted above. Thus, the behavioral profiles may include a profile related to general usage patterns (e.g., IP address, time of day, key-stroke biometrics, operation of the mouse while navigating through a website) and a profile related to behavioral characteristics while drawing the one or more marks. The techniques discussed below may be applied to general usage patterns and/or the behavioral characteristics while drawing the one or more marks, for example.

Information Used in Generating Behavioral Profiles

A behavioral profile may include characteristics (e.g., behaviors, information) of the user. Typical usage patterns of behavior that the user may be identified from using historical usage data based on information may include: authentication logs, click-trail data (e.g., online activity), user across channel business process history, user level demographic data (possibly from a marketing department associated with organization 145), previous warnings indicating suspicious activity, a list of high risk web pages (e.g., webpages associated with transferring money out of an account), and other information provided by information receiving/extracting module 235. These data sources may be used to create the behavioral profile in the following manners.

Authentication log data may track all attempted authentications with organization 145 as well as other data related to the authentication process. For instance, authentication logs include the date and time in which a user's password, marks, or security questions are changed. The authentication logs store authentication attempts across channels. Metrics such as the method and frequency with which the user changes his password or marks (e.g., whether the user normally calls in to have their password changed) and how many times the user normally has to be authenticated may be used in building the user behavioral profile. This data can also be helpful in combination with all the other sources to help capture a normal path for users and fraudsters. For example, it could be out of the norm for a user to fail their online authentication forcing them to call in and have a representative update their information, but this could be a normal pattern for a fraudster.

The click-trail data captures the activity of online users as they carry out their day-to-day transactions through the organization's website. The advantage of using click-trail is that the sheer volume of transactions logs for each user makes it possible to develop a unique understanding of each user's website usage. Information as to which pages users visit, the order user visit pages, and how long users stay on each page is available within click-trail.

The user across-channel business process history includes records the transactions or business processes that occur on each user's account across all channels. As the name implies, this data captures the transactions regardless of the channel on which a transaction is conducted. The across-channel understanding aids in the potentially multi-channel nature of ATO attempts and other fraudulent behavior. In an example of across-channel behavioral characteristics, each time a user deposits money in the user's account at a specific ATM (first channel), within 20 minutes, the user checks her account online to ensure that the funds were deposited. In another example, if a user typically requests a password or mark reset via an email, a password or mark request via phone call may indicate fraud. This data is also useful for establishing what transaction cadence is normal for each user across all of the channels and entities related to a company or organization.

Demographic data may be used in establishing behavioral profiles for users with relatively little history and may be used to establish conditional thresholds. Organizations may not initially have access to the type of specific information related to a user to build a behavioral profile. In such situations, a behavioral profile may initially be generated using demographic data of others that are similar to the user on the basis that what constitutes "normal behavior" for a user depends both on their own personal history as well as their life circumstances. Individuals with similar demographic profiles are more likely to have similar web behaviors. For instance, the threshold for investigating an unusual string of web transactions will likely be different for users in the baby boomers generation than for users in the millennial generation. In another example, a young, enlisted person who only has an auto policy with the organization may have different web behaviors than a married mother of four children who has all insurance and banking with the organization.

Demographic groups can be formed based on demographic categories such as: whether a user is active duty, military rank, marital status, gender, product depth and tenure with the company, and age of children. The groups can be formed on a more granular level by using these demographic categories to group users. By creating groups based on demographics and similar web behaviors, each user can have a group that represents that user without storing as much data as creating individual profiles for each person. In some embodiments, groups are defined by both demographics and the particular user's behaviors including web behaviors. In some embodiments, behavior profiles for each user include some demographic information relating to the user.

In some embodiments, the behavioral profile is initially created using demographic data, but the behavioral profile is adapted by the behavioral profile adaptation module 275 after data collection through one or more sessions with the user. Thus, the user's profile may be updated to incl4de more specific user behaviors instead of demographic data.

Models

The behavioral profile may be developed using one or a combination of different models or techniques. For example, the behavior profile may be developed using at least one of the following: Bayesian network, statistical-based anomaly detection techniques, one or more Markov models, knowledge-based techniques, neural networks, clustering and outlier detection, demographic analysis, genetic algorithms, or fuzzy logic techniques. The below examples are described specifically in modeling web behaviors, but these techniques and models may be used in modeling behaviors in other channels, or a combination of channels.

Statistical-Based Techniques

In statistical-based techniques, web activity is captured and a profile representing its stochastic behavior is created. Early approaches to statistical-based anomaly detection systems were related to univariate models. Parameters were modeled as independent Gaussian random variables thus defining an acceptable range of values for every behavior variable. Group comparisons may be used to detect irregular patterns of spending behavior by observing individuals that began to behave differently from their established pattern. "Three-level-profiling" focuses on behavioral changes for the purpose of fraud detection. Three-level-profiling functions at the account level and indicates significant deviations from an account's normal behavior as a potential fraud.

Later, multivariate models that consider the correlations between two or more metrics were proposed. A multivariate weighting system may be applied to data to give older information less importance than new information in anomaly detection systems. Time series models may use an interval timer, together with an event counter or resource measure, and take into account the order and the inter-arrival times of the observations as well as their values. Thus, an observed traffic instance will be labeled as abnormal if its probability of occurrence is too low at a given time.

In statistical-based anomaly detection systems, no prerequisite for prior knowledge of normal activity exists because statistical-based systems can learn the expected behavior by simply observing behaviors. Furthermore, as periods of observation grow longer and longer, statistical methods provide increased accuracy in detecting fraudulent activity.

In some embodiments, outliers may be detected by using a multiplier for a standard deviate. In other embodiments, more recent observations are weighted more than observations used in the distant past.

One proposed method under statistical based anomaly detection is to create confidence sets or confidence intervals for univariate models. Suppose $x_1, \ldots, x_n$ are the observed behaviors of a user from click-trail and $\theta$ is the normal behavior parameter that is trying to be defined, then the interval estimate is a pair of functions $L(x_1, \ldots, x_n)$ and $U(x_1, \ldots, x_n)$ such that the inference $L(x) <= \Theta <= U(x)$ is made. Parameters may be modeled as independent Gaussian random variables, thus, defining an acceptable range of values for every variable.

Another approach is to use an outlier detection method for univariate analysis which involves calculating a standard deviate for the parameter, e, in order to define an interval. In any event, interval estimates of the behavioral metrics will be calculated so that coverage probabilities will cover the actual normal behaviors of each individual user with, a high degree of certitude.

Another statistical-based technique proposed is multivariate models. In the multivariate case, Xi is defined as (Xi1; Xi2; . . . ; Xip)', a vector of p measures on a behavioral process at time i. When the behaviors are normal, the population of X is assumed to follow a multivariate normal distribution with the mean vector $\mu$ and variance-covariance matrix $\Sigma$. Using a sample of data of size n, the sample mean vector $\overline{X}$ and the sample covariance matrix S are usually used to estimate $\mu$ and $\Sigma$, where $$\overline{X} = (\overline{X_1}, \overline{X_2}, \ldots, \overline{X_p})'$$

and $$S = \frac{1}{n-1} \sum_{i=1}^{n} (X_i - \overline{X})(X_i - \overline{X})'.$$

Hotelling's $T^2$ statistic for an observation $X_i$ can be determined by:

$$T^2 = (X_i - \overline{X})'S^{-1}(X_i - \overline{X}).$$

A large value of $T^2$ indicates a large deviation of the observation $X_i$ from the observed normal pattern. The main difference between these and the univariate intervals is that multivariate models consider the correlations between two or more metrics. These are useful because experimental data have shown that a better level of discrimination can be obtained from combinations of related measures rather than individually.

Knowledge-Based Techniques

The expert system approach is one of the most widely used knowledge-based anomaly detection techniques. Electronic transactions may be procured and analyzed to reconstruct or detect a claim of fraud. Human pattern recognition skills may be combined with automated data algorithms. Information may be presented visually by domain-specific interfaces; that is, an automated algorithm filters which instances of fraud should be reviewed by expert auditors. One example specifies computer penetrations as sequences of actions that cause transitions in the security state of a system.

Forensic analytics may be used to review the invoicing activity for a vendor to identify fictitious vendors, and these techniques might also be used by a franchisor to detect fraudulent or erroneous sales reports by the franchisee in a franchising environment. Expert systems are intended to classify audit data according to a set of rules involving multiple steps: data collection, data preparation, data analysis, and reporting.

Methods where the desired model is manually constructed by a human expert could be potentially more restrictive. As long as the constructed specifications are complete enough, the model will be able to detect illegitimate behavioral patterns. In fact, the number of false positives can be reduced since this kind of system avoids the problem of harmless activities, not previously observed, being reported as intrusions.

Specifications have also been developed by more formal tools. Link analysis may be used to relate known fraudsters to other individuals by using record linkage and social network methods.

The most significant advantage of knowledge-based approaches to anomaly detection is their robustness and flexibility. In some embodiments, developing quality knowledge may be time-consuming.

An N-gram is a term from the field of computational linguistics and refers to a sequence of n items from a larger sequence. While N-grams are often used to look at the order of words in linguistic applications (i.e., sentiment analysis of tweets), they can also be used to analyze the sequence of webpages viewed by users. For instance, in one approach, the most common pages viewed preceding a "high risk" page is documented. By developing a baseline for each user of the most common N pages preceding the viewing of each high risk page, it is possible for an organization to detect abnormal web traffic over an arbitrary sequence depth to high risk pages.

In addition to calculating the most common routes to high-risk pages by the users, a similar calculation on web sessions known to be associated with account takeovers can be performed. This allows for a comparison between the most frequent routes to high risk pages for non-fraudulent traffic and the most frequent routes for malicious web traffic. The results of these analyses can, again, be setup as a system of flags. If a user takes a common route to a high risk page then that is a positive signal whereas if they take a route commonly used by malicious agents, then the web session could be flagged.

An advantage of the N-gram approach is that it can be expressed in terms of deterministic finite state. For example, the finite state machine methodology-a sequence of states and transitions among them-seems appropriate for modeling web behavior. Deterministic finite state automatons (DFSAs) are a common abstraction used to describe high performance pattern matching algorithms such as regular expressions.

Figure 3:
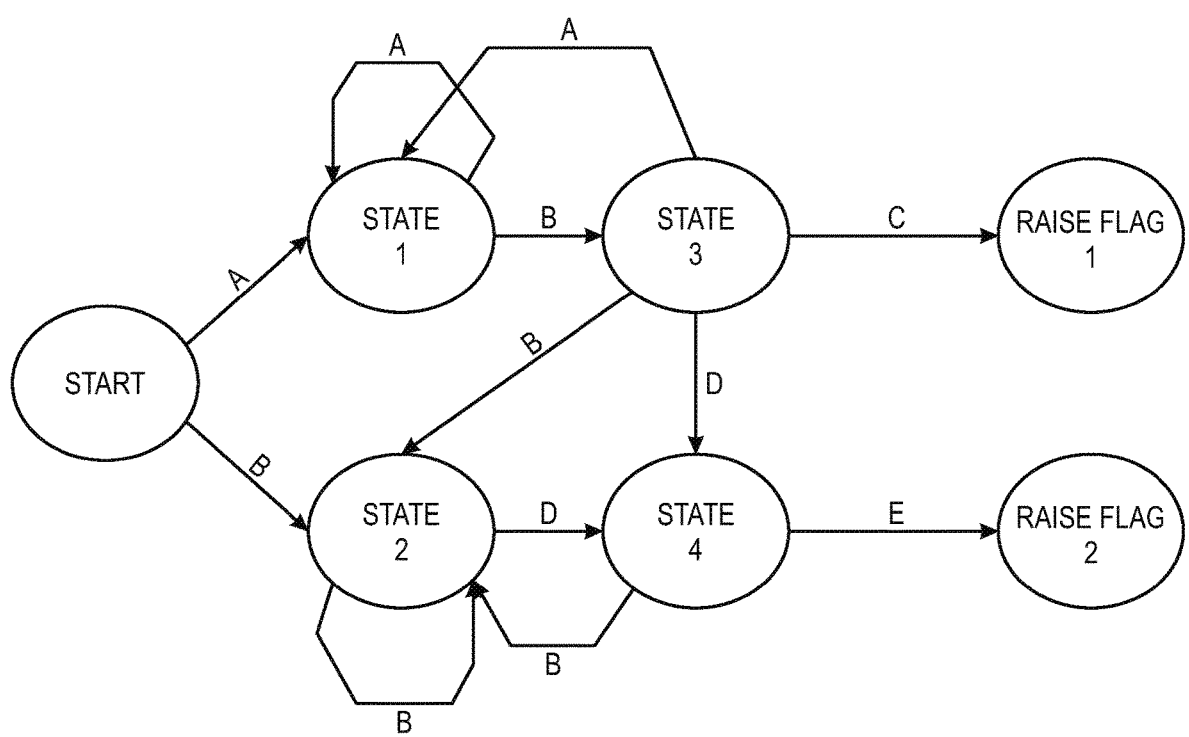
FIG. 3 illustrates a hypothetical deterministic finite state automation in accordance with various embodiments of the present disclosure.

To help illustrate this idea, consider the following example. Suppose that two high risk navigating patterns have been observed in the data. The first pattern is A-7 B-7 C. The second pattern is B-70-7 E. In this example, pages C and E are high risk web pages where it is possible for the association to be defrauded. From a technological perspective, it is desired to find a way to keep track of both navigational sequences that as pages are requested through the web sphere layer and to send a message/raise a flag in the event that one of the monitored sequences occurs. In some embodiments, this tracking method may be lightweight and have a small computational footprint. FIG. 3 displays a hypothetical DFA given the two example sequences, (ABC)|(BDE).

The circles with the indication "State" in FIG. 3 represents a finite set of states that occur. The arrows originating from a state show the conditions on which the machine should transition from one state to another. For instance, if the machine is in state 3 and the next page that a user requests is the page labeled D, then the machine should transition to state 4. Conversely, if the next page that is requested is page C, then the machine should raise a flag. For the sake of brevity, a number of transitions arrows have been omitted. The semantic meaning of the omitted arrows can be summed up by saying that if the next page that is requested does not have a corresponding arrow for that state, the machine should return to the "start" state. When implementing these DFAs in a programming language, "else conditions" may be used.

Performance of an implemented fraud detection model may be considered in constructing the behavioral profile model. The speed with which a web page loads has important ramifications on user perceptions of quality and enjoyment and may be tracked by search engines when calculating page rankings. When implementing a fraud prevention model like the one described here, most of the scoring can be asynchronous. In the example above, only pages C and E were high risk and thus it may only be necessary to check the model score when these two pages are requested. Model score can include many models providing input into decision-making. One architectural approach may be to use event processing to keep a running score of each session asynchronously, and to only request the model score (synchronous request) when a high risk page is requested.

Machine Learning Techniques

Machine learning techniques generally establish a model that analyzes patterns in data in order to classify an outcome. For example, machine learning techniques can analyze the patterns of normal web behaviors for users to determine whether or not fraud has occurred. Machine learning techniques require identified data to train the behavioral model; that is, a data set containing both fraudulent and non-fraudulent web sessions are required. The more accurate the data, the more predictive power a model. Applying machine learning techniques to anomaly-based detection is similar to applying statistical-based systems, though machine learning systems focus on a model that improves its performance by learning from previous results.

Consequently, a machine learning anomaly-based detection system can change its execution strategy as new information is obtained making it desirable for anomaly detection applications. In some embodiments, machine learning techniques have large resource requirements.

(i) Bayesian Networks

A Bayesian network is a model that deciphers the probabilistic relationships among variables. Several advantages, like incorporating both prior knowledge and data, come from combining this technique with other statistical schemes. Bayesian networks may be implemented to detect credit card fraud, telecommunications fraud, medical insurance fraud, and auto claim fraud. In some embodiments, a hybrid knowledge/statistical-based system where expert knowledge is integrated with statistical inference may be implemented.

The results from Bayesian networks are remarkably similar to those derived from less computationally intensive threshold-based systems. In some embodiments, Bayesian networks may be dependent on the assumptions about the behavior of the target system.

(ii) Markov Models

There are two main approaches to Markov models. First, a Markov chain is a set of states that are interconnected through certain transition probabilities, which determine the topology of the underlying process. Second, a hidden Markov model assumes that observed behaviors are a Markov process in which states and transitions are hidden. Only the "productions" are observable. Markov-based techniques may be used in intrusion detection systems. Hidden Markov models may score the probability of observing sequences of behaviors against a baseline. In network intrusion detection systems, the inspection of packets has led to the use of Markov models in some other approaches as well. The derived model may provide a good approach for establishing a normal profile. In some embodiments, results may be dependent on the assumptions about the behavior accepted for the system.

Aside from being more computationally intensive than statistical-based techniques, hidden Markov models typically involve analysis from any one current state to the next succeeding state. While it is possible to conduct Markov chain analysis where the starting state is described in terms of the previous N states, doing so greatly increases the dimensionality of the problem.

The basis for Markov chain analysis is that there are a finite number of "states" that can be observed. In an example, each webpage is represented by a state. The next step in Markov chain analysis is to calculate the probability of starting in a particular state and then transitioning to all of the other possible states. This set of conditional probabilities is often expressed in table form. When represented in table form, it is often referred to as a transition matrix because the table displays the probability of transitioning from any pair of states.

For example, suppose the following sequence of letters is observed: a, b, b, a, c, c, a, c, c. Table 1 outlines the transition matrix with each cell representing the associated probability of transitioning from one letter to the next. Since the sequence a,a, is never observed, the associated probability is zero. Likewise, since the sequences b,c or c,b are never observed, their associated transition probabilities are also zero. For the transitions that are observed, this method calculates the associated probabilities of observing each transition. For example, the probability of observing the sequence a,c is two-thirds.

TABLE 1

Hypothetical Transition Matrix

| Starting | Ending | | |
|---|---|---|---|
| | a | b | c |
| a | 0.00 | 0.33 | 0.67 |
| b | 0.50 | 0.50 | 0.00 |
| c | 0.33 | 0.00 | 0.67 |

The application of Markov chains in this example is to exchange the letters in the example above with actual page stems from click-trail. Using this mathematical framework, a baseline probability may be first calculated for each user. Once baseline transition behavior is established, it is possible to calculate the likelihood of observing any sequence of page views and determine if an observed transition is outside of what is expected. If the organization observes a web session that has a very low probability of occurring based on past experience, the session could be flagged as abnormal. In addition, the number of low probability transitions will be counted, providing insight into abnormal behavior with less computational burden.

(iii) Neural Networks

Neural networks are useful for anomaly detection because of their flexibility. Neural networks are sophisticated modeling techniques that are able to model complex functions. They often boast more predictive power than more traditional predictive models since they can fit adaptable non-linear curves to data. Neural networks are often used when the exact nature of the relationship between inputs and output is unknown. This detection approach may be used to create user profiles, to predict the next command from a sequence of previous ones, and to identify the intrusive behavior of traffic patterns.

In some embodiments, neural networks may require a large diversity of training for real-world operation. In other embodiments, neural network models may not provide a descriptive model that explains why a particular detection decision has been taken; that is, there would be no way to tell why a particular session was flagged as fraudulent. Identifying which behaviors or behavioral changes contributed most to labeling a web session as fraudulent may be useful, especially if a particular behavior is indicative of future attacks.

Figure 4:
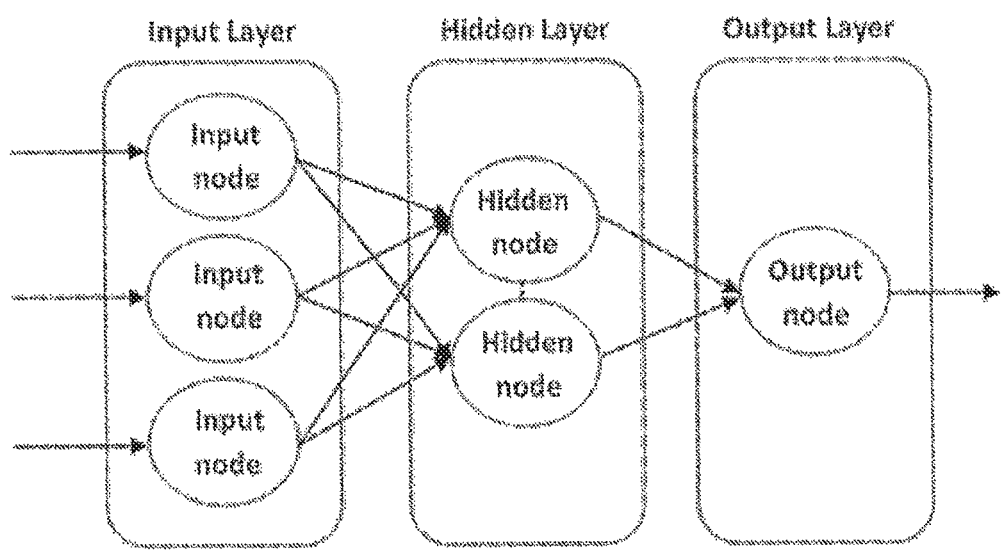
FIG. 4 illustrates a hypothetical neural network model in accordance with various embodiments of the present disclosure.

Neural networks come in all shapes and forms. Selecting an appropriate network structure helps in building a good predictive model. A general form of an example model is shown in FIG. 4. Generally, neural networks are composed of an input layer, with as many nodes as the number of input behaviors and features being considered, and an output layer, which in this example is a regression function made up of a single node representing whether or not a web session is fraudulent. In between the input and output layers though, the neural network may be configured with any number of hidden-layers and nodes.

Choosing the correct number of nodes may be challenging. If too few hidden nodes for a neural network model are chosen, the mapping function between the web behaviors and the fraud indicator may not be learned. If too many nodes are chosen, the model over fits the data, making it unable to predict future events.

Hierarchical clustering methods offer n possible solutions for a data set with n objects. As such, these clustering procedures are time consuming. Moreover, in some embodiments, once the clusters are assigned, they cannot be amended. A useful alternative to hierarchical clustering techniques is the k-means approach. The most common k-means algorithm uses an iterative refinement technique. Given an initial set of k means: m1(t), . . . , mk(t) (see below), the algorithm proceeds by alternating between two steps:

1. Assignment step: Each observation is clustered to the nearest clusters mean.

$$S_i^{(t)} = \{x_p : \|x_p - m_i^{(t)}\| \leq \|x_p - m_j^{(t)}\| \forall 1 \leq j \leq k\}$$

where each observation, $x_p$, is assigned to exactly one cluster, S(t), even if it could be assigned to two or more of them.

2. Update step: New means for each cluster are calculated as the centers of the observations within the new clusters. The algorithm has converged when the assignments no longer change.

$$m_i^{(t+1)} = \frac{1}{|S_i^{(t)}|} \sum_{x_j \in S_i^{(t)}} x_j$$

(iv) Fuzzy Logic Techniques

Fuzzy logic based techniques can be used in anomaly detection because many of the features considered in anomaly detection systems can be thought of as approximate rather than precise. Similar to univariate statistical based anomaly detection techniques, fuzzy techniques consider an observation as normal if it lies within a given interval. In some embodiments, high resource consumption may be used with fuzzy logic techniques.

(v) Genetic Algorithms

Inspired by evolutionary biology, genetic algorithms borrow from concepts like inheritance, mutation, selection, and recombination to deriving classification rules and/or selecting appropriate features or optimal parameters for the detection process.

One advantage of this type of machine learning anomaly detection technique is the use of a flexible and robust search method that converges to a solution from multiple directions. In some embodiments, no prior knowledge about behaviors is assumed. Its high resource requirement makes it less desirable compared to other methods.

(vi) Clustering and Outlier Detection

The observed user behavior may be aggregated, and the resulting aggregations could elucidate fraudulent behavior through group characteristics. Clustering techniques work by grouping the observed data into clusters using a similarity or distance measure. In general, a cluster begins with a representative point. Then, each new data point is considered and classified as either belonging to an established cluster or not according to the proximity of the corresponding representative point. Outliers are then points that may not belong to any cluster and could represent the anomalies in the detection process.

Determining whether or not an outlier is actually an anomaly is a heavily researched question among fraud researchers. Often, different clustering algorithms indicate different clusters, and within the fraud literature there is no real agreement on which algorithm works best. For example, some systems use the k-nearest neighbor approach with the Euclidean distance to define the membership of data points to a given cluster. Other systems use the Mahalanobis distance. These distance definitions can then be used to associate a certain degree of being an outlier for each point. Nevertheless, clustering techniques determine the occurrence of intrusion events using only raw audit data, and so the effort required to tune the anomaly detection system is reduced.

Variation determination module 250 can identify, in real-time or near real-time, variations between the behavioral characteristics of the user interactions observed during the current session and the behavioral profile previously developed based on prior usage patterns of the user through the channels or demographic information. Variations may be detected using the methods described above with respect to the particular methods or techniques of modeling behavioral profiles. For example, variations may include variations in behavioral biometrics (e.g., the username/password was typed at a different cadence than the user typically types the username/password, the mark was drawn with different behavioral characteristics than those typical for the user), webpage viewing, device ownership, or any of the other behavioral characteristics discussed above in connection with the information receiving/extracting module 235.

In some embodiments, the variation determination module 250 identifies that a second user is using the account based on the variations. Variation determination module 250 may further determine that the second user is authorized by the user by viewing a profile of the user or by other mechanisms (e.g., asking questions, alerting the user). For example the user may be the spouse of the user and the two may share the account. Behavioral profile generation module 245 may then generate a behavioral profile for the second user.

Distance threshold module 255 may establish a threshold for the amount or type of variation between the behavioral profile and current usage patterns. Variations in usage patterns from variation determination module 250 may be received into distance threshold module 255, which then calculates a distance of the current usage behavior from the behavioral profile. The threshold may be derived from compliance module 280, and/or from business rules, regulations, or other rules. The threshold may be based on the level of risk of requested activities in the session. For example, the distance threshold for purchasing automobile insurance may be much higher than the distance threshold for transferring funds out of an account (i.e. the variations in behavioral patterns can be much greater for purchasing insurance than for transferring funds). It should be appreciated that the variation determination module 250 may also identify variations between a current mark and one or more marks stored in the behavior profile (e.g., via image matching techniques) as part of the authentication process. Additionally, the distance threshold module 255 may establish a mark matching threshold for the amount or type of variation between the current mark and the one or more marks stored in the behavioral profile, and the distance threshold module 255 may determine whether the variation is within the mark matching threshold.

Challenge level module 260 can determine a challenge level for the user and may implement the challenge level for the user to proceed in the session. The challenge level may be based on the variations between the current behavioral characteristics and historical behavioral characteristics embodied in the behavioral profile. The challenge level may be directly correlated with the distance between the current usage patterns and the behavioral profile estimated by distance threshold module 255. Accordingly, if the risk level of the activity is higher and the usage patterns are not matching up, the challenge level may be higher.

Challenge level module 260 may implement a challenge level to proceed in the session. The challenge levels may result in allowing the user to proceed with the session, collecting additional identifying information, noting suspicious activity, or disallowing the user to proceed with the session. In some embodiments, the challenge level may require a response from the user, or the challenge level may be met by information being collected from the user's device with no response or action by the user (e.g., the user is identified, verified, or authenticated passively). In other embodiments, the challenge level may be met by a next action of the user, such as the next webpage the user navigates to. In some embodiments, the challenge level includes prompting the user to draw one or more marks. The difficulty level of the mark and/or the number of marks requested may vary based on the distance between the current usage patterns and the behavioral profile estimated by distance threshold module 255 and/or based on a risk level associated with the activity. If the current mark drawn matches the one or more marks in the profile and/or if the behavioral characteristics of the user while drawing the mark match the profile, then the user may be allowed to proceed with the session. However, if the current mark drawn does not match the one or more marks in the profile and/or if the behavioral characteristics of the user while drawing the mark does not match the profile, then the user may be blocked from proceeding with the session and/or be prompted to draw another mark.

Validation module 265 validates the user and/or the behavioral profile during the current session when a usage pattern during the current session is within a predetermined distance from the typical usage pattern of the user or when the user has provided sufficient additional identifying information (e.g., one or more marks). Validation module 265 may receive an implemented challenge level from the challenge level module 260. The validation may be done passively, that is, without any user information, particularly when the challenge level results in allowing the user to proceed with the session. For example, the behavioral profile may validate the user's mobile device, allowing the user to take some actions without providing any additional information. Validation module 265 may also validate the user when the user provides additional information in response to a challenge level requiring the user to provide additional identifying information, if the information provided by the user satisfies the challenge level.

Response module 270 can request additional identifying information from the user. The challenge level may be received from the challenge level module 260 and the user may be presented with a question or an action that the user is required to take in order to proceed in the session (e.g., draw a mark). In some embodiments, the user may be providing a response without knowledge of the response. For example, the user may be required not to go to a particular website or to take another action in order to validate the behavioral profile and/or validate that the user is not a fraud. After a response to the challenge level is received, behavioral profile adaptation module 275 may be adapted based on the response.

Behavioral profile adaptation module 275 can adapt the behavioral profile of a user as additional information is gained. For example, a behavioral profile may initially be created using demographic data of users similar to the users. However, the behavioral profile may be adapted with the user behavior from the current session. The demographic information may, over time, be removed or deemphasized from the behavioral profile as the user behavioral profile is adapted with the user behavior from additional sessions with the user.

Behavioral profile adaptation module 275 may also adapt the behavioral profile based on the behavioral characteristics that triggered the challenge level. Behavioral profile adaptation module 275 may adapt the behavioral profile of the user based on responses the user provides to response module 270 when responding to a challenge level. For example, if the user is asked to provide additional identifying information, the user's behavioral profile may be updated with the information.

Compliance module 280 measures the success of the behavioral profiler in detecting fraud. In some embodiments, the success is measured by meeting baseline requirements such as computational performance (running in approximately 200 ms per page request).

In some embodiments, compliance module 280 generates a model that correctly identifies as many fraudulent transactions as possible subject to some predetermined maximum threshold on false-positives. An advantage of this approach is that it is simple and does not require a great deal of data to use.

In other embodiments, compliance module 280 uses a cost-based approach to measuring success. Varying amounts of risk are associated with different transactions. As such, the magnitude of these risks may be used to more accurately define success. For instance, with the appropriate data on the quantity of money lost to various kinds of fraudulent transactions, the model may be improved to target those transactions which pose the greatest monetary risk to the association. Likewise, if the cost of auditing or investigating transactions is known, this too can be used in decided whether to deny and flag a transaction for review. For instance, transactions with expected losses that are less than the audit and investigation costs may not be flagged for review.

Compliance module 280 may provide an optimization goal. The optimization goal may be used in the variation determination module 250 and distance threshold module 255. For example, the method of choosing numerical weights to assign to different kinds of anomalies will be different if the optimization goal is to maximize correct predictions versus maximizing the dollar value of model where the cost of fraudulent transactions is weighed against the cost of auditing false-positives.

GUI generation module 285 can generate one or more GUI screens that allow for interaction with a user. In at least one embodiment, GUI generation module 285 generates a graphical user interface allowing a user to view accounts, report losses, track claims status, set preferences, and/or otherwise receive or convey information to the user.

Figure 5:
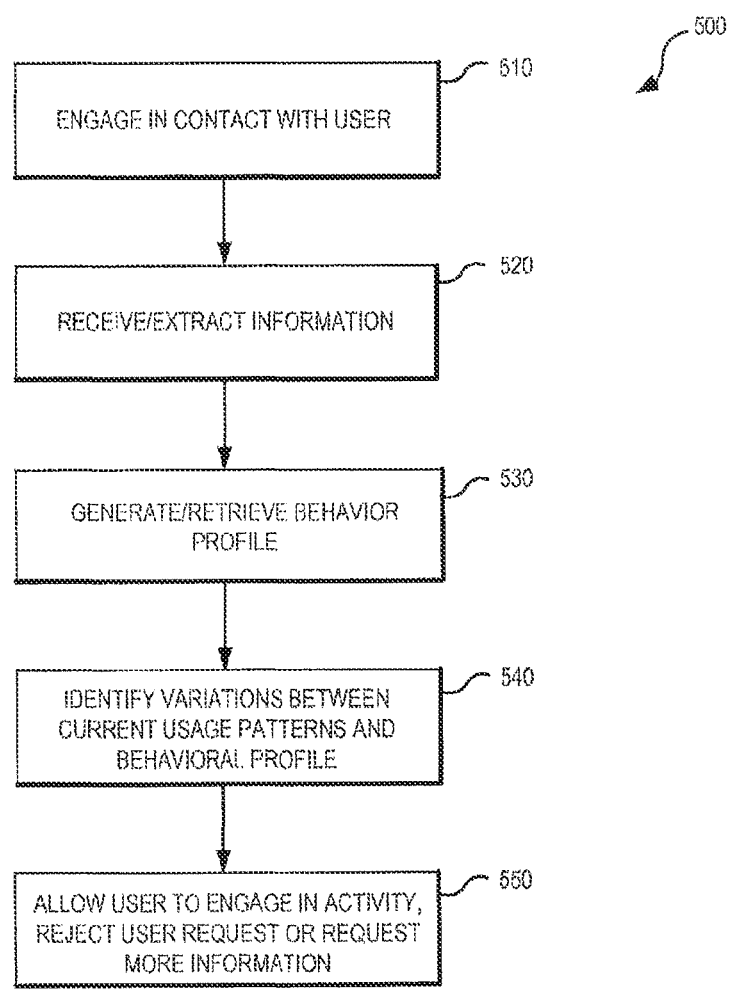
FIG. 5 is a flowchart illustrating a set of operations for determining whether a user may engage in an activity in accordance with various embodiments of the present disclosure.

FIG. 5 is a flow chart illustrating a set of operations 500 for determining whether a user may engage in an activity in accordance with various embodiments of the present disclosure. The operations can be performed by various components such as processor(s) 220, channel communication module 225, activity request receiver 230, information receiving/extracting module 235, behavioral biometrics module 240, behavioral profile generation module 245, variation determination module 250, distance threshold module 255, challenge level module 260, validation module 265, response module 270, behavioral profile adaptation module 275, compliance module 280, and/or other modules or components.

Engaging operation 510 engages in a contact with a user. The contact may be through a channel such as a web portal, a mobile application, instant messaging system, face-to-face contact, and the like. The contact may include a request for the user to engage in an activity such as view an account, purchase insurance, file a claim, transfer funds, and the like. The contact with the user may establish a current session with the user. Engaging operation 510 may record, observe, and/or monitor interactions during and after the contact. Usage patterns may be detected during engaging operation 510.

Information relating to the channel, the user, and the requested activity may be collected, gathered, or otherwise extracted by collecting operation 520. Collected information may include information related to the device, location of the user, demographics of others similar to the user, prior and current web behaviors of the user (e.g., click-trails, logon attempts), prior activity requests, security notes in the user's account, type of the requested activity, and other information.

Behavioral profile generation operation 530 uses the information collected in collecting operation 520 to generate a behavior profile for the user. Many different types of models or techniques may be used in creating the behavior profile for the user such as a Bayesian network, statistical-based anomaly detection techniques, one or more Markov models, knowledge-based techniques, neural networks, clustering and outlier detection, demographic analysis, genetic algorithms, or fuzzy logic techniques. The behavior profile is updated with information from the current session, further establishing patterns of the user.

In some embodiments, behavioral profile generation operation 530 generates the profile over time from various interactions with the user. Demographic information of users similar to the user may be incorporated into a profile for the user, particularly when little information is available.

Variations are identified between current usage patterns and the behavioral profile in identification operation 540. A threshold, or distance, between the current usage patterns and the behavioral profile may be established. A challenge level for the user to proceed with the session may be implemented based on the distance between the current usage patterns and the behavioral profile.

Decision operation 550 decides whether the user is allowed to engage in the activity and/or proceed with the session, reject the user request to engage in the activity and/or proceed in the session, or request the user to provide additional information. The various decisions in decision operation 550 are based on the variations identified in identification operation 540. For example, if variations between the behavioral profile and the current usage are minimal and thus the distance is short, the user may be permitted to continue without providing additional information. In some embodiments, if variations are great, but the risk level of the requested activity is extremely low, the user may be permitted to continue without providing additional information.

Figure 6:
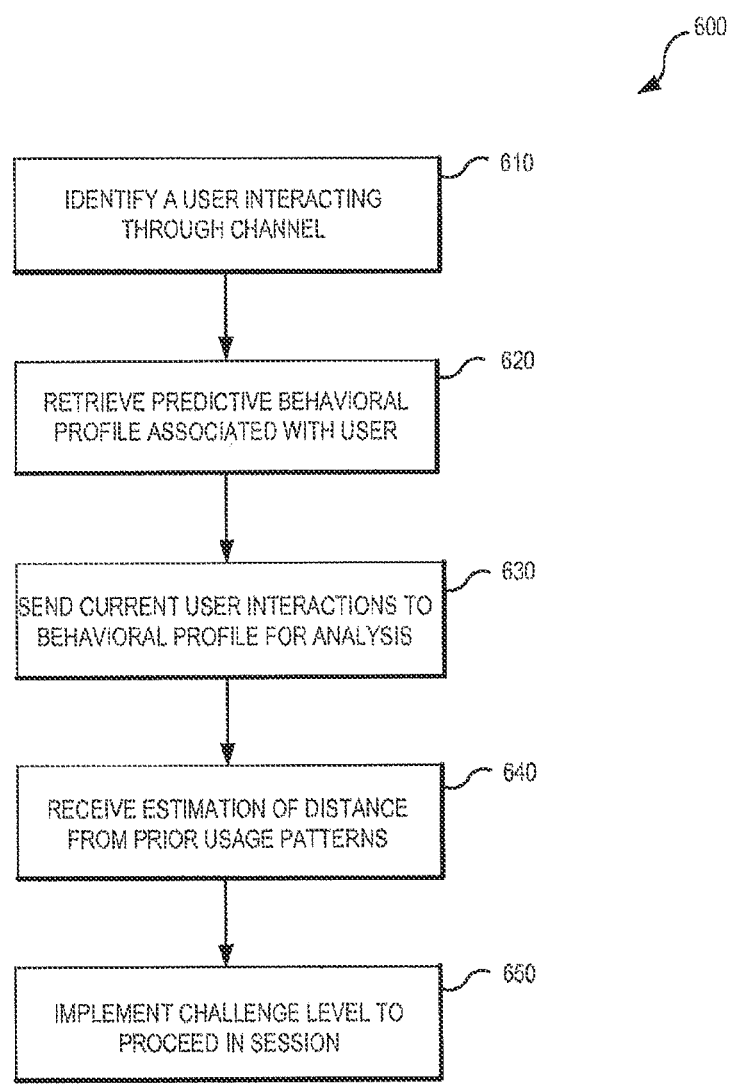
FIG. 6 is a flowchart illustrating a set of operations for verifying a user in accordance with various embodiments of the present disclosure.

FIG. 6 is a flow chart illustrating a set of operations 600 for verifying a user in accordance with various embodiments of the present disclosure. The operations can be performed by various components such as processor(s) 220, channel communication module 225, activity request receiver 230, information receiving/extracting module 235, behavioral biometrics module 240, behavioral profile generation module 245, variation determination module 250, distance threshold module 255, challenge level module 260, validation module 265, response module 270, behavioral profile adaptation module 275, compliance module 280, and/or other modules or components.

User identification operation 610 identifies a user interacting through a channel. A channel may be a personal computer, mobile device, telephone, POS device, ATM machine, and related software and/or hardware such as a web portal, a mobile application, instant messaging system, and the like. User identification operation 610 may identify the user by a username/password/mark, device, voice or behavioral biometrics, and the like. The interaction may include speaking with a representative regarding opening an account, opening up a new line of credit via a mobile application, transferring funds through the web portal, etc.

The identification may be passive, meaning that the user may not have to take an action to be identified. For example, the user may be identified by calling in using a phone listed in the user's profile. In another example, the user may view their account on a mobile device, in which the user is identified by the phone number associated with the device and the network accessed by the device.

After the user is identified in user identification operation 610, behavioral profile retrieving operation 620 retrieves a behavior profile associated with the user. The behavioral profile may be stored in a database such as behavioral profile database 150.

Analysis operation 630 analyzes the current user interactions and behaviors and compares these interactions with the interactions and behaviors that are predicted based on the behavioral profile. Analysis operation 630 may identify differences in current user interactions and the user's behavioral profile.

Using the information provided by analysis operation 630, estimation operation 640 estimates the distance of the user's behaviors from the prior usage patterns. For example, the behavioral profile may indicate a large variation in user behavior if the user checks an account balance 95% of the time the user transfers money to any other account and failed to check the account balance during this session but still is attempting to transfer out funds.

Challenge implementation operation 650 may implement a challenge to proceed with the session based on the distance estimated by the estimation operation 640. A large distance may indicate a high risk level, thus indicating that the actions may be fraudulent. A challenge may include a request for additional information. The amount or type of information requested may depend on the distance. In some embodiments, the challenge may include a prompt to draw one or more marks.

For example, if the user wants to view a webpage related to insurance purchasing, even though the user has never viewed the insurance webpage in previous interactions, business rules may evaluate the activity as low risk and the user may not be required to provide additional authentication. In another example, suppose the user requests a transfer of money from a deposit account to an investment account at a different financial institution. The information received in connection with the channel may indicate that the IP address is from South Korea. Comparing the request to the user behavioral profile may indicate that this activity is very typical for this user because she is a member of the army stationed in South Korea and consistently transfers funds of similar values to outside investment accounts. Thus, although for many users this may be considered a high risk activity requiring some intense challenges by the challenge implementation operation, for this user, it is typical, as shown by the user's behavioral profile.

Computer System Overview

Figure 7:
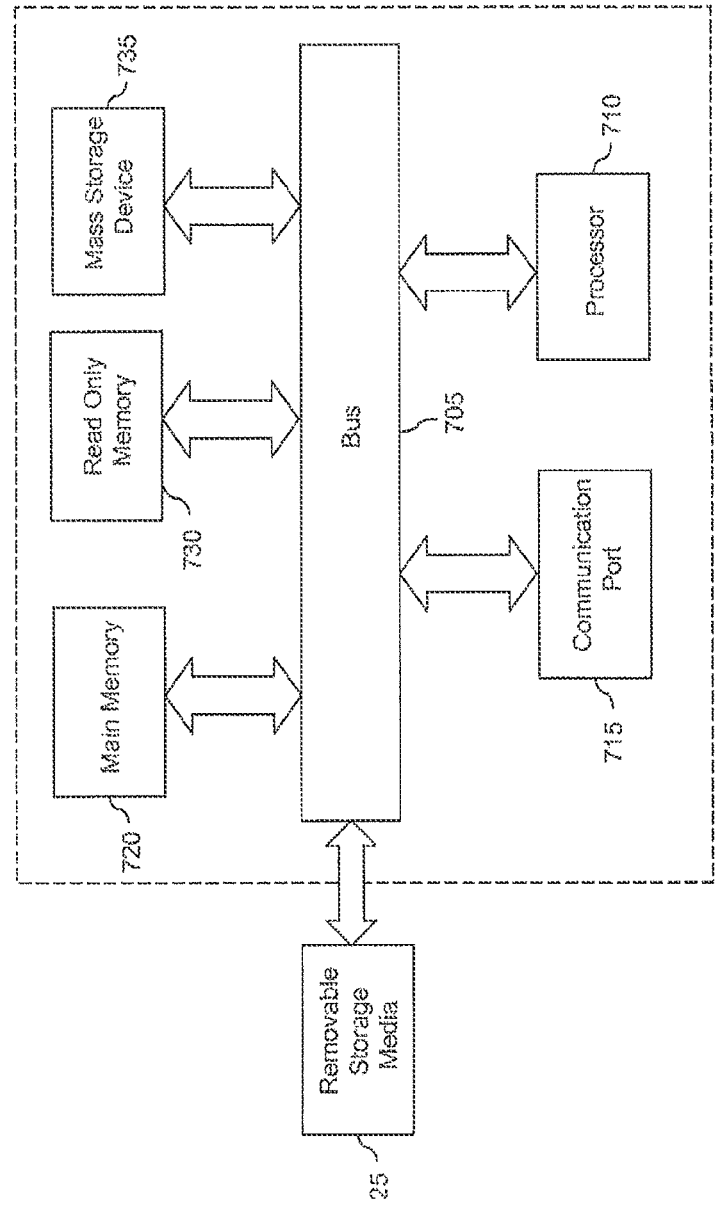
FIG. 7 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. According to the present example, the computer system includes a bus 705, at least one processor 710, at least one communication port 715, a main memory 720, a removable storage media 725, a read only memory 730, and a mass storage device 735.

Processor(s) 710 can be any known processor, such as, but not limited to, an Intel® Itanium® or Itanium 2® processor(s), or AMD® Opteron® or Athlon MP® processor(s), or Motorola® lines of processors. Communication port(s) 715 can be any of an RS-232 port for use with a modem-based dialup connection, a 10/100 Ethernet port, or a Gigabit port using copper or fiber. Communication port(s) 715 may be chosen depending on a network such a Local Area Network (LAN), Wide Area Network (WAN), or any network to which the computer system 700 connects.

Main memory 720 can be Random Access Memory (RAM), or any other dynamic storage device(s) commonly known in the art. Read only memory 730 can be any static storage device(s) such as Programmable Read Only Memory (PROM) chips for storing static information such as instructions for processor 710.

Mass storage device 735 can be used to store information and instructions. For example, hard disks such as the Adaptec® family of SCSI drives, an optical disc, an array of disks such as a RAID, such as the Adaptec family of RAID drives, or any other mass storage devices may be used.

Bus 705 communicatively couples processor(s) 710 with the other memory, storage, and communication blocks. Bus 705 can be a PCI/PCI-X or SCSI based system bus depending on the storage devices used.

Removable storage media 725 can be any kind of external hard-drives, floppy drives, IOMEGA® Zip Drives, Compact Disc-Read Only Memory (CD-ROM), Compact Disc-Re-Writable (CD-RW), or Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present disclosure may be provided as a computer program product which may include a machine-readable medium having stored thereon instructions which may be used to program a computer (or other electronic devices) to perform a process. The machine-readable medium may include, but is not limited to, floppy diskettes, optical discs, compact disc read-only memories (CD-ROMs), and magneto-optical discs, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present disclosure may also be downloaded as a computer program product, wherein the program may be transferred from a remote computer to a requesting computer by way of data signals embodied in a carrier wave or other propagation medium via a communication link (e.g., a modem or network connection).

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for behavioral profiling. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

The invention claimed is:

1. A computer-implemented method, comprising:
providing a prompt that instructs a user to enter an identifier as part of an access process for an account session; and
in response to determining that the identifier is incorrectly entered as part of the access process for the account session:
providing an additional prompt that instructs the user to draw a mark;
identifying behavioral characteristics of the user while the user draws the mark;
comparing the behavioral characteristics to a behavioral profile based on prior behavioral characteristics of the user; and
enabling the account session in response to determining that a variation between the behavioral characteristics and the behavioral profile is within a threshold.

2. The computer-implemented method of claim 1, wherein the identifier comprises a user name, a password, an initial mark, or any combination thereof.

3. The computer-implemented method of claim 1, wherein the mark comprises a signature representative of a name or initials of the user, a letter, a shape, or any combination thereof.

4. The computer-implemented method of claim 1, wherein the behavioral characteristics comprise how the user moves a mouse, what area of a button on the mouse the user holds down while operating the mouse, an amount of pressure applied to the mouse while operating the mouse, or any combination thereof.

5. The computer-implemented method of claim 1, comprising, in response to determining that the identifier is incorrectly entered as part of the access process for the account session, selecting the additional prompt from a plurality of prompts stored in a prompt database, wherein the additional prompt comprises respective instructions to draw the mark, and other prompts of the plurality of prompts comprise respective instructions to draw other marks different from the mark.

6. The computer-implemented method of claim 5, comprising:
providing at least one of the other prompts of the plurality of prompts to the user during a stage of the account session, and enabling the user to carry out an activity within the account session in response to the user successfully drawing the at least one other mark instructed by the at least one of the other prompts.

7. The computer-implemented method of claim 6, wherein the activity comprises a transfer of funds from an account accessible via the account session.

8. The computer-implemented method of claim 1, comprising, in response to determining that the identifier is incorrectly entered as part of the access process for the account session:
identifying additional behavioral characteristics of the user related to operation of a computing device prior to the account session;
comparing the additional behavioral characteristics to the behavioral profile;
determining a mark difficulty level based on a respective variation between the additional behavioral characteristics and the behavioral profile; and
selecting the additional prompt from a plurality of prompts stored in a prompt database, wherein the additional prompt instructs the user to draw the mark having the mark difficulty level.

9. The computer-implemented method of claim 8, wherein the additional behavioral characteristics comprise a cadence of typing during entry of the identifier, spacing between key presses during the entry of the identifier, a duration of each keypress during the entry of the identifier, or any combination thereof.

10. The computer-implemented method of claim 1, comprising:
comparing the mark drawn by the user to a prior mark previously drawn by the user; and
enabling the account session in response to determining that the variation between the behavioral characteristics and the behavioral profile is within the threshold and that a respective variation between the mark drawn by the user and the prior mark previously drawn by the user is within a mark matching threshold.

11. An authentication system, comprising:
a processing system comprising one or more processors; and
a memory storing instructions that when executed by the processing system cause the authentication system to:
provide a prompt that instructs a user to enter an identifier as part of an access process for an account session; and
in response to determining that the identifier is incorrectly entered as part of the access process for the account session:
provide an additional prompt that instructs the user to draw a mark;
identify behavioral characteristics of the user while the user draws the mark;
compare the behavioral characteristics to a behavioral profile previously developed based on prior behavioral characteristics of the user; and
enable the account session in response to determining that a variation between the behavioral characteristics and the behavioral profile is within a threshold.

12. The authentication system of claim 11, wherein the identifier comprises a username, a password, or both, and the mark comprises a signature representative of a name or initials of the user, a letter, a shape, or any combination thereof.

13. The authentication system of claim 11, wherein the instructions, when executed by the processing system, cause the authentication system to provide a backup prompt that instructs the user to draw an additional mark different from the mark in response to the variation between the behavioral characteristics and the behavioral profile exceeding the threshold.

14. The authentication system of claim 11, wherein the instructions, when executed by the processing system, cause the authentication system to enable the user to select the identifier and to draw the mark one or more times during a setup process associated with an account accessible via the account session.

15. The authentication system of claim 14, wherein the instructions, when executed by the processing system, cause the authentication system to develop the behavioral profile based on respective behavioral characteristics of the user as the user draws the mark the one or more times during the setup process.

16. The authentication system of claim 11, wherein the instructions, when executed by the processing system, cause the authentication system to:
   in response to determining that the identifier is incorrectly entered as part of the access process for the account session, select the additional prompt from a plurality of prompts stored in a prompt database, wherein the additional prompt comprises respective instructions to draw the mark, and other prompts of the plurality of prompts comprise respective instructions to draw other marks different from the mark.

17. The authentication system of claim 16, wherein the instructions, when executed by the processing system, cause the authentication system to provide at least one of the other prompts of the plurality of prompts during a stage of the account session, and to enable the user to carry out an activity within the account session in response to the user successfully drawing the at least one other mark instructed by the at least one of the other prompts.

18. The authentication system of claim 11, wherein the instructions, when executed by the processing system, cause the authentication system to:
   identify additional behavioral characteristics of the user related to operation of a computing device prior to the account session;
   compare the additional behavioral characteristics to the behavioral profile;
   determine a mark difficulty level based on a respective variation between the additional behavioral characteristics and the behavioral profile; and
   select the additional prompt from a plurality of prompts stored in a prompt database, wherein the additional prompt instructs the user to draw the mark having the mark difficulty level.

19. An authentication system, comprising:
   a processing system comprising one or more processors; and
   a memory storing instructions that when executed by the processing system cause the authentication system to:
      provide a prompt that instructs a user to enter an identifier as part of an access process for an account session;
      provide an additional prompt that instructs the user to draw a mark as part of the access process for the account session; and
      enable the account session in response to determining that the identifier is correctly entered and that a variation between behavioral characteristics of the user while the user draws the mark and a behavioral profile based on prior behavioral characteristics of the user is within a threshold.

20. The authentication system of claim 19, wherein the instructions, when executed by the processing system, cause the authentication system to:
   compare the mark to a prior mark previously drawn by the user; and
   enable the account session in response to determining that the identifier is correctly entered, the variation between the behavioral characteristics and the behavioral profile is within the threshold, and a respective variation between the mark drawn by the user and the prior mark previously drawn by the user is within a mark matching threshold.

* * * * *